(12) United States Patent
Luo et al.

(10) Patent No.: US 8,311,282 B2
(45) Date of Patent: Nov. 13, 2012

(54) IMAGE PROCESSING APPARATUS, IMAGE PROCESSING METHOD, AND PROGRAM

(75) Inventors: Jun Luo, Tokyo (JP); Takefumi Nagumo, Kanagawa (JP); Yuhi Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 98 days.

(21) Appl. No.: 13/030,447

(22) Filed: Feb. 18, 2011

(65) Prior Publication Data
US 2011/0235942 A1 Sep. 29, 2011

(30) Foreign Application Priority Data

Mar. 23, 2010 (JP) ................................. 2010-065833

(51) Int. Cl.
*G06K 9/00* (2006.01)
(52) U.S. Cl. ....................................................... 382/103
(58) Field of Classification Search .................... 382/103
See application file for complete search history.

(56) References Cited

U.S. PATENT DOCUMENTS

| 7,336,807 B2* | 2/2008 | Tabata | 382/118 |
| 7,477,759 B2* | 1/2009 | Kaplan | 382/103 |
| 8,213,681 B2* | 7/2012 | Nobori et al. | 382/103 |

FOREIGN PATENT DOCUMENTS

JP 2009-290827 12/2009

* cited by examiner

*Primary Examiner* — Alex Liew
(74) *Attorney, Agent, or Firm* — Oblon, Spivak, McClelland, Maier & Neustadt, L.L.P.

(57) ABSTRACT

An image processing apparatus includes: a motion prediction processing unit detecting an inter-image motion between a standard image and a reference image; a motion compensation processing unit generating a motion-compensated image by moving the reference image so as to be aligned with the standard image in a pixel position; an addition processing unit generating a noise-reduced image from which noise of the standard image is reduced; and an addition determination unit calculating an addition weight of the motion-compensated image. The addition determination unit includes a first motion region detection unit calculating a motion region determination value, a second motion region detection unit calculating a motion region determination value, a control map generation unit selecting and outputting one of two motion region determination values, a noise determination table generation unit generating or correcting a noise determination table, and an addition determination processing execution unit determining the addition weight.

11 Claims, 21 Drawing Sheets

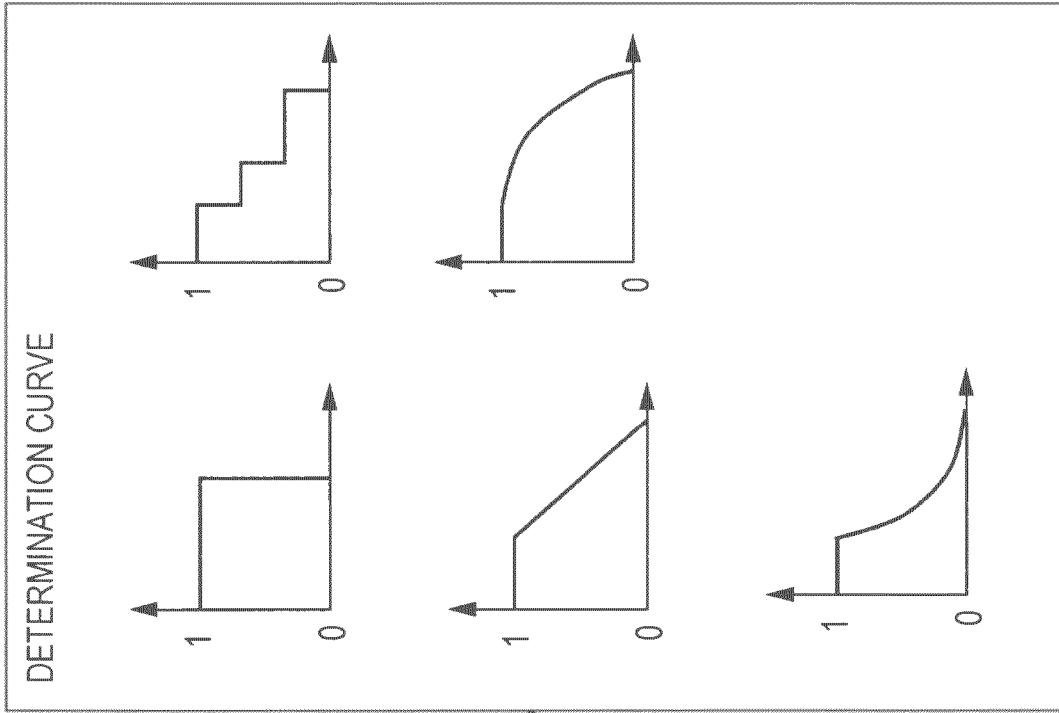
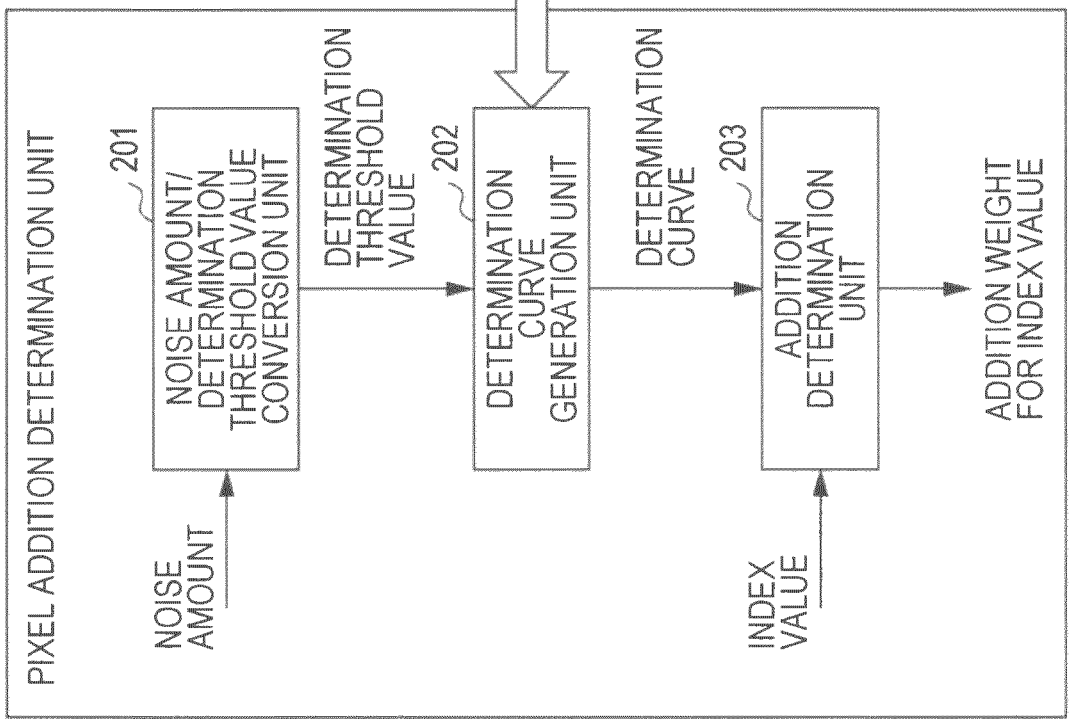
FIG. 6A / FIG. 6B

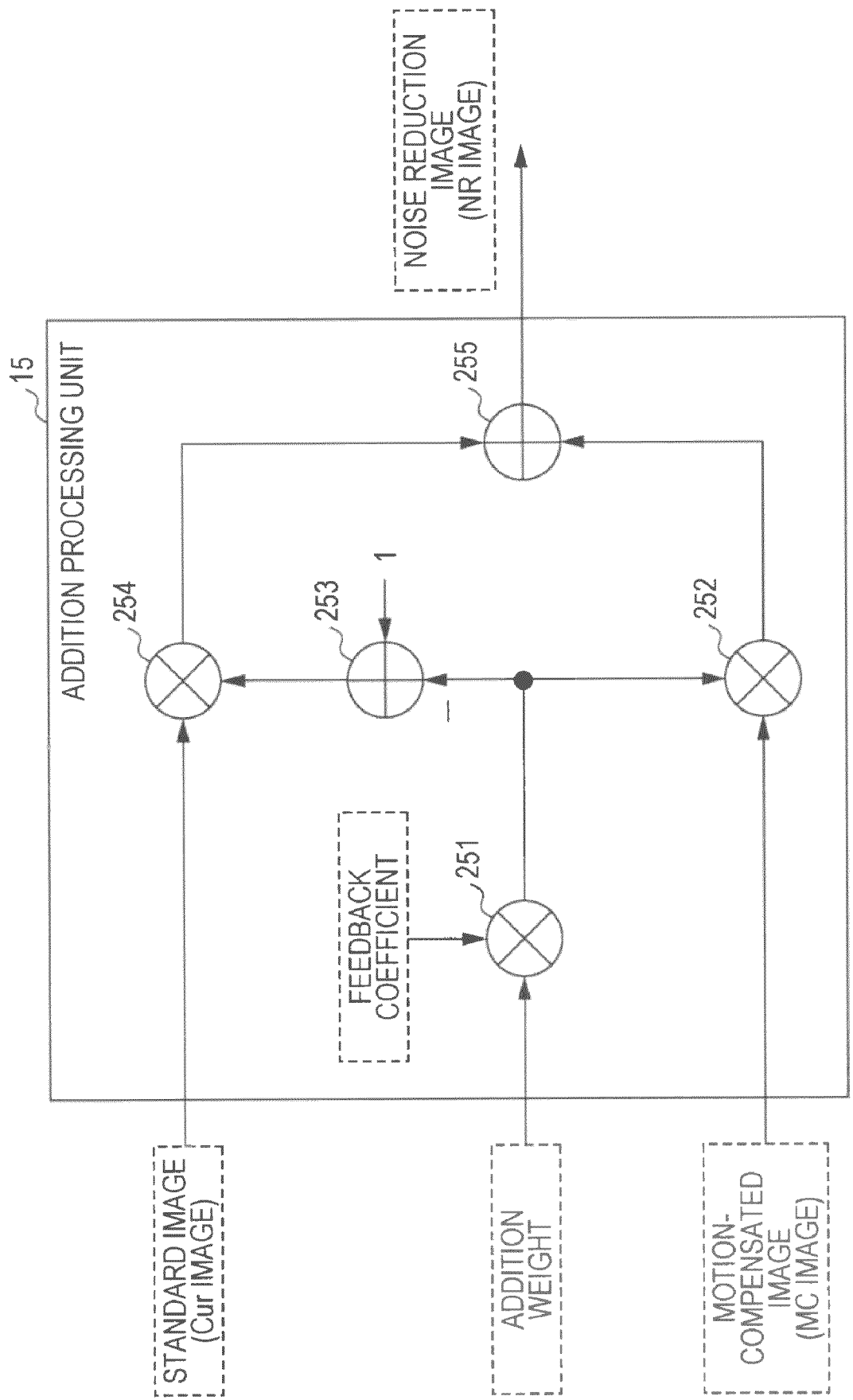

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program, and more particularly, to an image processing apparatus, an image processing method, and a program capable of generating a motion-compensated image or reducing noise in an image.

2. Description of the Related Art

An image photographed with an imaging apparatus such as a camera or a video apparatus include much noise. In particular, an image photographed under low illumination or for a short exposure time generally includes much noise. When an image is photographed under the low illumination or for the short exposure time, one of causes of the image including much noise is a reduction in the amount of charge accumulated in an imaging element since the amount of incident light is small. In order to acquire a bright image based on the imaging data, it is necessary to amplify a signal. When the signal is amplified, the noise generated in an imaging element or in an analog circuit is amplified and thus an image includes much noise.

In order to reduce the noise, long time exposure is effective. However, when exposure is performed for a long time, there is a possibility that image blurring occurs due to camera shaking during the exposure. The method of reducing the noise includes a method of lowering (reducing) noise which is not correlated with time by performing continuous shooting to photograph images repeatedly at a high shutter speed and performing addition averaging of the plurality of images photographed at different times by the continuous shooting so that exposure blurring rarely occurs. However, a problem may arise in that processing efficiency deteriorates since the addition processing of the plurality of images causes a considerable amount of calculation.

For example, Japanese Unexamined Patent Application Publication No. 2009-290827 according to the related art discloses a method of lowering (reducing) noise in a time direction as the method of reducing the noise by performing the addition averaging of the plurality of images photographed at different times by continuous shooting.

In Japanese Unexamined Patent Application Publication No. 2009-290827, a process of performing addition averaging of the pixel values of corresponding pixels of a plurality of images determined to be formed by photographing the same subject by position adjustment of the plurality of images photographed at different times is basically performed. For example, a motion-compensated image (MC image) is generated by moving a subject on a reference image to the same position of the subject on a standard image using the standard image which is a noise reduction target and the reference image before one frame of the standard image. Then, the addition averaging is performed on the corresponding pixels between the standard image and the motion-compensated image (MC image) to generate a noise-reduced image.

However, when this process is performed, the pixels of the motion-compensated image (MC image) may become subject pixels different from the corresponding pixels of the standard image in a region of a moving subject having motions different from the motions of the entire image, for example, a region of a moving subject such as a car or a person. In the motion region, control is performed so as to increase the weight of the pixel values of the standard image by lowering an addition weight of the pixels of the motion-compensated image (MC image) for the standard image.

That is, the noise reduction process is performed such that the addition averaging of the corresponding pixels between the standard image and the motion-compensated image (MC image) is actively performed in a region determined to be a motionless region other than a region of a moving subject, whereas the influence of the addition averaging is reduced to considerably reflect the pixel values of the standard image in a region of a moving subject.

In Japanese Unexamined Patent Application Publication No. 2009-290827, a process of detecting a motion region is performed by comparing a global motion vector (GMV) corresponding to the motion of the entire image to a local motion vector (LMV) which is a motion vector of a block region which is a division region in an image and determining that a block with the large difference obtained by the comparison is a motion region.

The motion determination precision obtained by the process of comparing the global motion vector (GMV) to the local motion vector (LMV) is considerably lowered, when the vector precision is lowered depending on the precision of the generated vector. For example, a block including the motion region of a local region smaller than a block region set to calculate a local motion vector may not sometimes be determined as a motion region block. In this case, in the local motion region, a problem may arise in that addition averaging of the corresponding points of the plurality of same images as motionless regions is performed and thus the noise is further increased.

When the process of detecting the motion vector is performed, the corresponding points are searched by performing a matching process through comparison of the pixel values of the plurality of images continuously photographed. However, for example, when an illumination condition is changed during the photographing of the images, it is difficult to search the corresponding points of the images and thus the motion vector may not be appropriately calculated. In this case, a problem may arise in that the detection precision of the motion region deteriorates in the process of comparing the global motion vector (GMV) to the local motion vector (LMV) and thus an image from which the noise is effectively reduced may not be generated.

SUMMARY OF THE INVENTION

It is desirable to provide an image processing apparatus, an image processing method, and a program capable of realizing generation of a high-quality noise-reduced image by improving a process of determining a motion region and calculating an addition weight with high precision in a configuration in which the noise-reduced image is generated through synthesis of a plurality of images.

It is desirable to provide an image processing apparatus, an image processing method, and a program capable of realizing generation of a high-quality noise-reduced image by performing both a process of determining a motion region through a comparison between a global motion vector (GMV) and a local motion vector (LMV) and a process of determining the motion region also using motion estimation (ME) success determination information calculated based on pixel difference information of a standard image and a motion-compensated image and by calculating an addition weight with high precision using the detection information of the motion region by two different approaches.

According to an embodiment of the invention, there is provided an image processing apparatus including: a motion prediction processing unit detecting an inter-image motion between a standard image and a reference image; a motion compensation processing unit generating a motion-compensated image by moving the reference image so as to be aligned with the standard image in a pixel position using information regarding the inter-image motion detected by the motion prediction processing unit; an addition processing unit generating a noise-reduced image from which noise of the standard image is reduced through an addition process of adding the standard image and the motion-compensated image; and an addition determination unit calculating an addition weight of the motion-compensated image, which is applied to the addition process performed between the standard image and the motion-compensated image by the addition processing unit, by a pixel unit. The addition determination unit includes a first motion region detection unit calculating a motion region determination value indicating a region including a moving subject by a region unit forming the standard image based on pixel difference information between the standard image and the motion-compensated image, a second motion region detection unit calculating a motion region determination value of the region unit by applying difference information between a local motion vector (LMV) which is motion information of the region unit and a global motion vector (GMV) which is motion information of an entire image, a control map generation unit selecting and outputting one of two motion region determination values output from the first motion region detection information and the second motion region detection information depending on a combination of the motion region determination values, a noise determination table generation unit generating or correcting a noise determination table in which an estimated noise amount corresponding to a pixel value is defined according to motion region determination information of a region unit output from the control map generation unit, and an addition determination processing execution unit determining the addition weight according to the noise amount of a pixel unit estimated based on the noise determination table generated by the noise determination table generation unit.

In the image processing apparatus according to the embodiment of the invention, the control map generation unit may output a determination value of the first motion region detection unit as a final determination value in a region determined to be highly likely to be a motion region by at least one of the two motion region determination values output from the first motion region detection unit and the second motion region detection unit. The control map generation unit may output the determination value of the second motion region detection unit as a final determination value in a region determined not to be highly likely to be motion region according to both of the two motion region determination values output by the first motion region detection unit and the second motion region detection unit.

In the image processing apparatus according to the embodiment of the invention, the noise determination table generation unit may generate or correct the noise determination table to increase the estimated noise amount corresponding to the pixel value in a region where a determination value indicating that the region is unlikely to be the motion region is set according to the motion region determination information of the region unit output from the control map generation unit. The noise determination table generation unit may generate or correct the noise determination table to reduce the estimated noise amount corresponding to the pixel value in a region where a determination value indicating that the region is highly likely to be the motion region is set according to the motion region determination information of the region unit output from the control map generation unit.

In the image processing apparatus according to the embodiment of the invention, the addition determination process execution unit may perform a process of determining the addition weight to set the addition weight to be large in a region where the noise amount of the pixel unit estimated by the noise determination table generated by the noise determination table generation unit is large and to set the addition weight to be small in a region where the noise amount of the pixel unit is small.

In the image processing apparatus according to the embodiment of the invention, the first motion region detection unit may analyze the standard image and the motion-compensated image to determine whether each region divided from the motion-compensated image is a region corresponding to one of (a) a motion estimation (ME) success region, (b) a motion estimation (ME) failure region, and (c) a boundary region which is neither of (a) the motion estimation (ME) success region nor (b) motion estimation (ME) failure region, and calculates a motion region determination value of each small region according to the determination result.

According to another embodiment of the invention, there is provided an image processing method of generating a noise-reduced image in an image processing apparatus including the steps of: detecting, by a motion prediction processing unit, an inter-image motion between a standard image and a reference image; generating, by a motion compensation processing unit, a motion-compensated image by moving the reference image so as to be aligned with the standard image in a pixel position using information regarding the inter-image motion detected by the motion prediction processing unit; generating, by an addition processing unit, a noise-reduced image from which noise of the standard image is reduced through an addition process of adding the standard image and the motion-compensated image; and calculating, by an addition determination unit, an addition weight of the motion-compensated image, which is applied to the addition process performed between the standard image and the motion-compensated image by the addition processing unit, by a pixel unit. The step of calculating the addition weight includes the steps of firstly calculating a motion region determination value indicating a region including a moving subject by a region unit forming the standard image based on pixel difference information between the standard image and the motion-compensated image, secondly calculating a motion region determination value of the region unit by applying difference information between a local motion vector (LMV) which is motion information of the region unit and a global motion vector (GMV) which is motion information of an entire image, selecting and outputting one of two motion region determination values output from the first motion region detection information and the second motion region detection information depending on a combination of the motion region determination values, generating or correcting a noise determination table in which an estimated noise amount corresponding to a pixel value is defined according to motion region determination information of a region unit output in the step of selecting and outputting one of the two motion region determination values, and determining the addition weight according to the noise amount of a pixel unit estimated based on the noise determination table generated in the step of generating or correcting the noise determination table.

According to still another embodiment of the invention, there is provided a program causing an image processing apparatus to execute a process of generating a noise-reduced image. The program executes the steps of: detecting, by a motion prediction processing unit, an inter-image motion between a standard image and a reference image; generating, by a motion compensation processing unit, a motion-compensated image by moving the reference image so as to be aligned with the standard image in a pixel position using information regarding the inter-image motion detected by the motion prediction processing unit; generating, by an addition processing unit, a noise-reduced image from which noise of the standard image is reduced through an addition process of adding the standard image and the motion-compensated image; and calculating, by an addition determination unit, an addition weight of the motion-compensated image, which is applied to the addition process performed between the standard image and the motion-compensated image by the addition processing unit, by a pixel unit. The step of calculating the addition weight includes the steps of firstly calculating a motion region determination value indicating a region including a moving subject by a region unit forming the standard image based on pixel difference information between the standard image and the motion-compensated image, secondly calculating a motion region determination value of the region unit by applying difference information between a local motion vector (LMV) which is motion information of the region unit and a global motion vector (GMV) which is motion information of an entire image, selecting and outputting one of two motion region determination values output from the first motion region detection information and the second motion region detection information depending on a combination of the motion region determination values, generating or correcting a noise determination table in which an estimated noise amount corresponding to a pixel value is defined according to motion region determination information of a region unit output in the step of selecting and outputting one of the two motion region determination values, and determining the addition weight according to the noise amount of a pixel unit estimated based on the noise determination table generated in the step of generating or correcting the noise determination table.

The program according to the embodiment of the invention can be supplied through a storage medium or a communication medium that is supplied in a computer readable format, for example, for an image processing apparatus or a computer system capable of executing various program codes. By supplying such a program in a computer readable format, processing is realized according to the program on the image processing apparatus or the computer system.

The other goals, features, and advantages according to an embodiment of the invention are apparent from the detailed description by the embodiments of the invention or the accompanying drawings. In the specification, a system is a logical collective composition of a plurality of apparatuses and each apparatus of each configuration is not limited to be within the same chassis.

According to an embodiment of the invention, in a configuration in which a noise-reduced image is generated by a synthesis process for the motion-compensated image obtained through motion compensation of the standard image and the reference image, the final motion region determination information is generated by applying two kinds of motion region determination information: the first motion region detection information calculated based on the pixel difference information between the standard image and the motion-compensated image and the second motion region detection information calculated by applying the difference information between the local motion vector (LMV) which is the motion information of the region unit and the global motion vector (GMV) which is the motion information of the entire image. The addition weight of the motion-compensated image for the standard image is determined by estimating noise based on the final motion region determination information. Moreover, the noise-reduced image is generated by adding the standard image and the motion-compensated image applying the determined addition weight. Thus, since the motion region determination precision is improved and the addition weight can be set according to the reliability of the motion-compensated image, it is possible to realize the process of generating a high-quality noise-reduced image.

BRIEF DESCRIPTION OF THE DRAWINGS

FIGS. 6A and 6B are diagrams illustrating an exemplary detailed configuration of a pixel addition determination unit.

FIG. 7 is a diagram illustrating an exemplary configuration of an addition processing unit.

DESCRIPTION OF THE PREFERRED EMBODIMENTS

Hereinafter, an image processing apparatus, an image processing method, and a program according to embodiments of the invention will be described in detail with reference to the drawings. Hereinafter, the description will be made sequentially according to the following lists.
(1) Basic Configuration of Image Processing Apparatus Generating Noise-Reduced Image
(1a) Configuration and Process of Image Processing Apparatus Generating Noise-Reduced Image
(1b) Configuration and Process of Addition Determination Unit and Addition Processing Unit
(2) Example of Image Processing Apparatus Generating Noise-Reduced Image Applying Detection Information of High Precision Motion Region according to Embodiment of the Invention
(2a) Overall Configuration of Image Processing Apparatus
(2b) Configuration of Addition Determination Unit
(2b-1) Configuration and Process of First Motion Region Detection Unit (Flat Map Generation Unit)
(2b-2) Configuration and Process of Second Motion Region Detection Unit (Hit Map Generation Unit)
(2b-3) Configuration and Process of Control Map Generation Unit
(2b-4) Configuration and Process of Noise Determination Table Generation Unit
(2b-5) Configuration and Process of Addition Determination Process Execution Unit
(2c) Process of Addition Processing Unit
(3) Noise Reduction Effect of Image Processing Apparatus according to Embodiment of the Invention
(4) Exemplary Hardware Configuration of Image Processing Apparatus

(1) Basic Configuration of Image Processing Apparatus Generating Noise-Reduced Image (1a) Configuration and Process of Image Processing Apparatus Generating Noise-Reduced Image First, an exemplary basic configuration of an image processing apparatus generating a noise-reduced image by performing an image synthesis process using a plurality of images will be described below with reference to FIG. 1.

Figure 1:
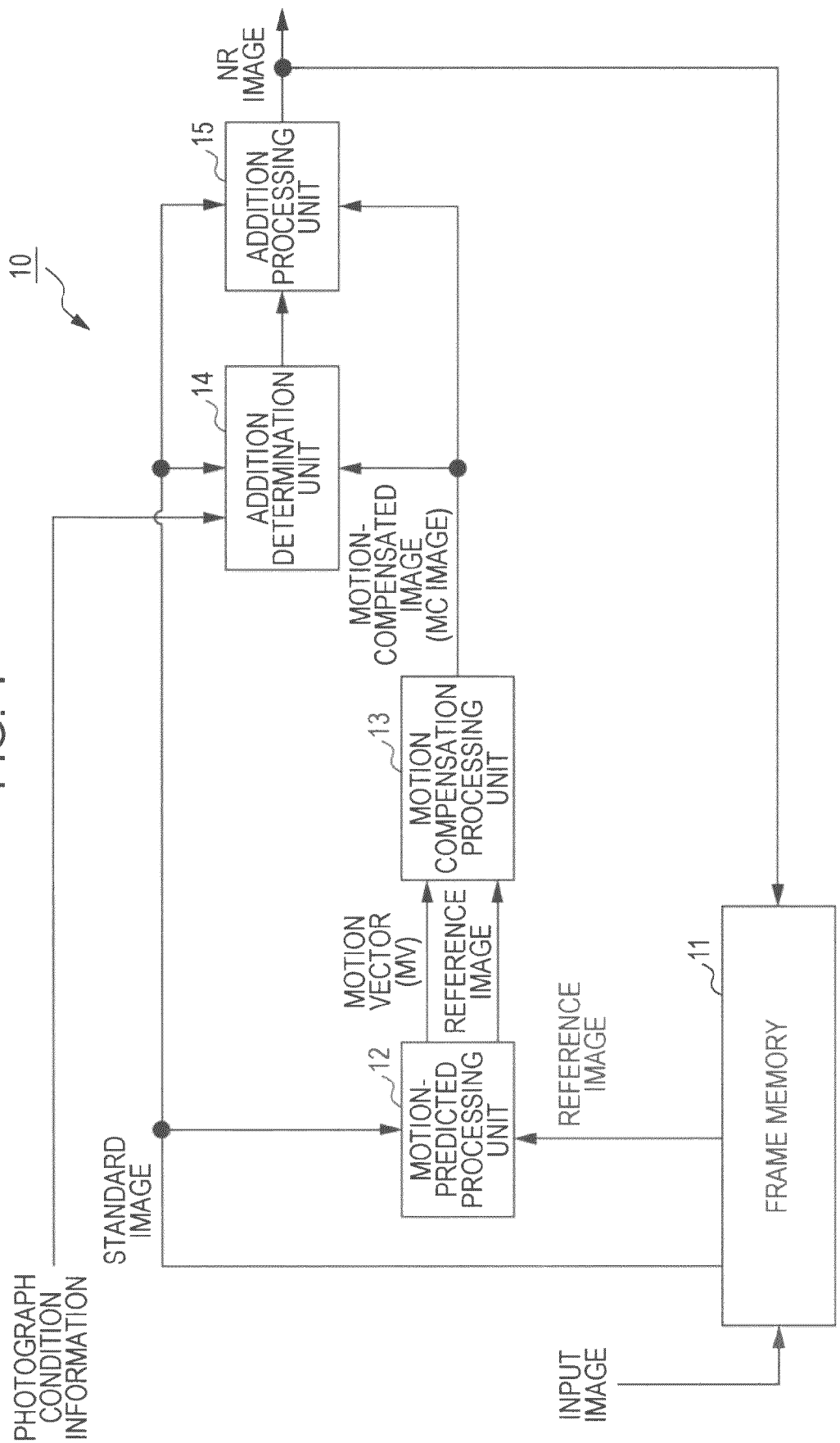
FIG. 1 is a diagram illustrating an exemplary configuration of an image processing apparatus performing a process of generating a noise-reduced image.

FIG. 1 is a diagram illustrating the configuration of the image processing apparatus performing a process of generating a noise-reduced image by performing an image synthesis process by applying a plurality of images. The image processing apparatus shown in FIG. 1 has almost the same configuration of an image processing apparatus disclosed in the previous patent application (Japanese Patent Application No. 2007-136184) of the same applicant as the applicant of this application. According to this embodiment of the invention, the configuration of the image processing apparatus disclosed in the previous patent application (Japanese Patent Application No. 2007-136184) is improved to implement generation of a high-quality noise-reduced image. The example of the image processing apparatus according to this embodiment of the invention will be described below in the list (2). First, the configuration and process of the image processing apparatus will be described as a basis in the list (1).

An image processing apparatus 10 shown in FIG. 1 can be configured as a single image processing apparatus, but may be configured as one internal constituent element of, for example, a camera, a PC, or an image display apparatus.

Hereinafter, an example will be described in which the image processing apparatus 10 shown in FIG. 1 is provided inside a camera and continuously photographed images are sequentially stored as input images in a frame memory 11. The image processing apparatus 10 includes the frame memory 11, a motion prediction processing unit 12, a motion compensation processing unit 13, an addition determination unit 14, and an addition processing unit 15. The photographed images are sequentially stored as input images in the frame memory 11.

The input image is an image including noise. The image processing apparatus 10 shown in FIG. 1 reduces the noise from the input image and the addition processing unit 15 shown in FIG. 1 finally outputs a noise-reduced image (NR image).

A standard image and a reference image are input from the frame memory 11 to the motion prediction processing unit 12. The standard image refers to an image to be subjected to a noise reduction process. The reference image refers to an image which is applied in the noise reduction process for the standard image. For example, a motion vector is calculated from the standard image and the reference image. The noise reduction process for the standard image is performed by applying a plurality of continuously photographed reference images.

For example, a noise-reduced image generated by applying one standard image and one reference image is restored in the frame memory 11, and this noise-reduced image as a new standard image is subjected to a new noise reducing process by applying the subsequent second reference image. An exemplary specific example thereof will be described below with reference to FIG. 2.

The motion prediction processing unit 12 calculates a motion vector by applying the standard image and the reference image from the frame memory 11. For example, a motion vector MV of a block unit is output by aligning the position of a block of the reference image with the position of a corresponding block of the standard image by a small region (block) unit obtained by dividing one image frame. The motion vector MV refers to a vector indicating motions of an image between the standard image and the reference image. The motion vector can be set as a vector including not only information regarding parallel shift but also information regarding expansion, contraction, rotation, or the like.

The motion vector MV can be detected by applying, for example, a block matching method. The block matching method is a process of calculating a sum-of-absolute difference (SAD) between pixel values in the above-mentioned small region (block) and estimating a pair of blocks with a small sum of absolute difference (SAD) to be corresponding blocks. A vector binding the corresponding blocks of two images can be determined as the motion vector.

The motion compensation processing unit 13 generates a motion-compensated image (MC image) by performing motion compensation on the standard image or the reference image through application of the motion vector MV generated by the motion prediction processing unit 12. That is, a motion-compensated image (MC image) is generated by moving a standard image and a reference image so that the position of a subject in the standard image is adjusted with the position of a subject in the reference image. The motion-compensated image (MC image) generated by the motion compensation processing unit 13 is supplied to the addition determination unit 14 and the addition processing unit 15.

The addition determination unit 14 inputs the motion-compensated image (MC image) generated by the motion compensation processing unit 13, the standard image, and photographing condition information used to estimate the amount of noise. The photographing condition information includes information regarding a photographing mode, an exposure time, a gain, or the like supplied from, for example, an internal microcomputer of a camera and corresponding to an input image (photographed image).

The addition determination unit 14 generates an addition weight used in the addition processing unit 15 by a pixel unit. For example, when a motion-compensated image (MC image) obtained by moving the reference image so as to be aligned with the standard image in position is generated and an image synthesis process is performed, the addition weight is an addition weight of the pixels of the motion compensated image (MC image) obtained by addition averaging of the pixels of the standard image. When the alignment is correctly performed and the pixels of the motion-compensated image (MC image) and the corresponding pixels of the standard image are located at the same region of the same subject, it is possible to set a large addition weight. However, for example, when a moving subject such as a person or a car is included in a photographed image, the pixels of the motion-compensated image (MC image) and the corresponding pixels of the standard image are not located at the same region of the same subject in the region including the moving subject. Accordingly, the addition weight is preferably set to be small in the pixel region including the moving subject. Thus, the addition weight is preferably set to a value corresponding to a reliability degree of the respective pixels of the motion-compensated image (MC image).

That is, it is possible to generate an image from which noise is reduced, by performing an image synthesis process of determining correctness of the motion compensation between the standard image and the motion-compensated image (MC image) and increasing the addition weight of the pixels of the motion-compensated image (MC image) determined to be the same subject portion corresponding to the specific pixels of the standard image.

The addition determination unit 14 determines whether the motion compensation is correctly performed between the standard image and the motion-compensated image (MC image) and calculates an addition weight in which an addition ratio of the motion-compensation image (MC image) is increased, as a setting of improving the reliability of the correct pixels of the motion compensation. The addition determination unit 14 determines the addition weight by a pixel unit in the motion-compensated image (MC image).

For example, when the addition process is performed between the pixels of the same portion of the same object of two images photographed at different times, noise which is not correlated with time can be reduced by the addition. It can be said that reliability is high as correspondence certainty of the same portion of the same object of two images is high. In other words, since the reliability indicates whether noise is superimposed in the same image or noise is superimposed in a different image, it is necessary to form the addition weight in correspondence with only the amount of noise in the high-precision noise reduction process as far as possible. For example, the addition weight generated by the addition determination unit 14 is set to be 0 when the reliability is low, whereas the addition weight is set to be 1 when the reliability is high.

The addition processing unit 15 performs an addition process by applying the addition weight calculated for each of the corresponding pixels between the standard image and the motion-compensated image (MC image). The addition processing unit 15 performs the addition process by calculating a weighted average between the standard image and the motion-compensated image (MC image). The weight of the weighted average is a value obtained by multiplying an addition weight by a return ratio. For example, when the return ratio is set to 1/3 and when the addition weight is varied from 0 to 1, the weight for the MC image in the weighted average is varied from 0 to 1/3.

The addition result generated between the standard image and the motion-compensated image (MC image) by the addition processing unit 15 is stored in the frame memory 11. The image as a new standard image is combined with a new reference image and the above-described processes are repeatedly performed. For example, after the processes are repeated by a predetermined number of times, the addition result generated between the standard image and the motion-compensated image (MC image) by the addition processing unit 15 is output as the noise-reduced image (NR image).

Figure 2:
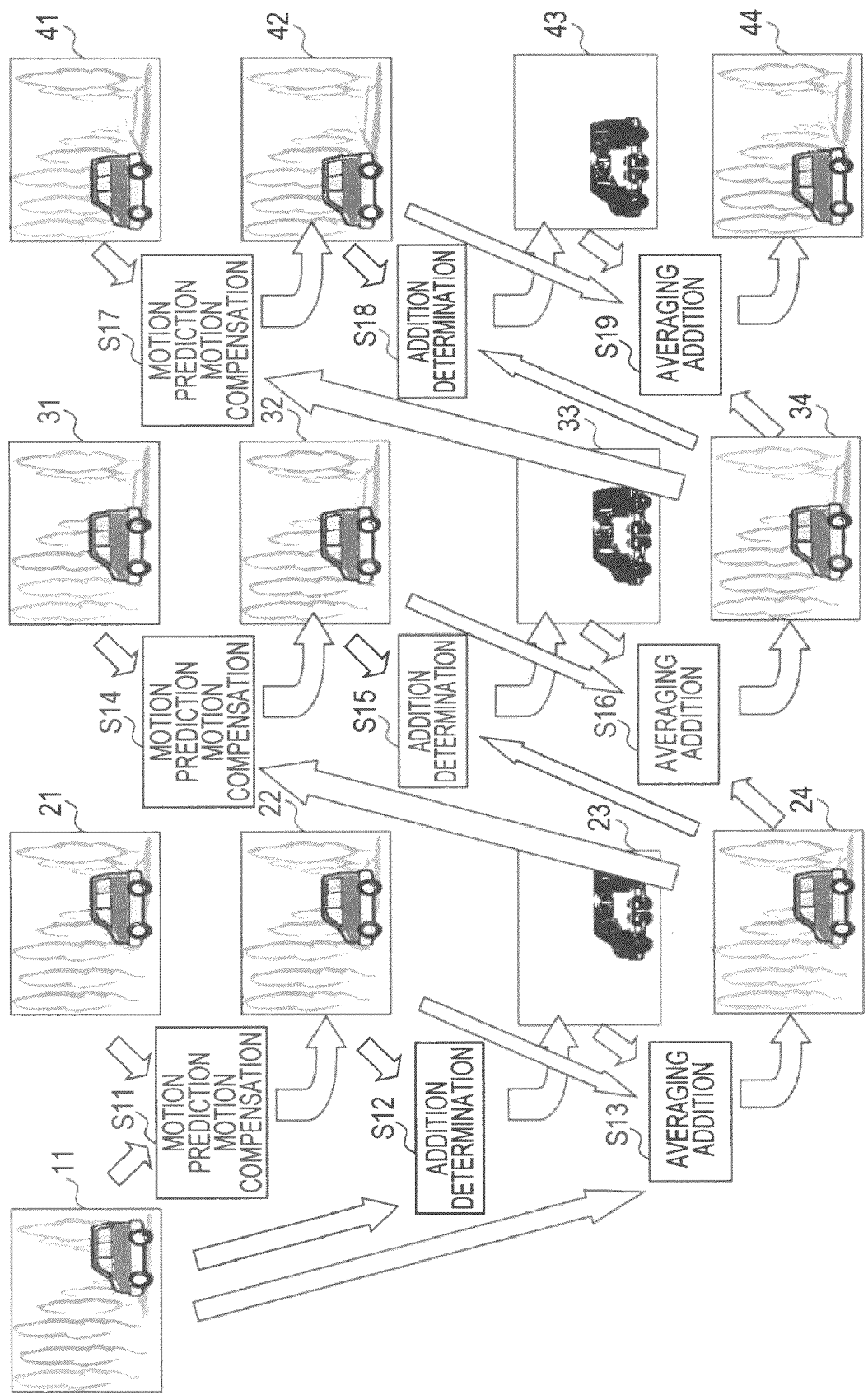
FIG. 2 is a diagram illustrating an exemplary process of generating the noise-reduced image.

An exemplary detailed processing example in which the image processing apparatus shown in FIG. 1 is applied will be described with reference to FIG. 2. Four images of a standard image a and reference images A to C shown in the uppermost part of FIG. 2 are images continuously photographed by a camera. Temporally, the standard image a is preferentially photographed, and then the reference images A to C are continuously photographed. In the example shown in FIG. 2, the standard image is a preferentially photographed image and the reference images are subsequently photographed images, and vice versa. That is, the standard image may be set to be a subsequently photographed image and the reference images in terms of time may be a plurality of preferentially photographed images.

In the example shown in FIG. 2, a process is performed by applying a standard image a11 and the reference image A which is a subsequently photographed image.

In step S11, a motion vector MV is calculated by applying the standard image a11 and a reference image A21, and then a motion-compensated image (MC image) is generated by applying the calculated motion vector MV.

For example, the block of the reference image A21 and the corresponding block of the standard image a11 are aligned with each other in a position to generate the motion vector MV by a block unit. This aligning process is performed by the motion prediction processing unit 12 shown in FIG. 1. The motion prediction processing unit 12 acquires the standard image a11 and the reference image A21 from the frame memory 11 and performs the process. Moreover, the motion compensation processing unit 13 generates a motion-compensated image (MC image) 22 by performing motion compensation on the reference image applying the motion vector MV.

Next, in step S12, the standard image a11 is compared to the motion-compensated image (MC image) 22, and then the addition determination process is performed to calculate the addition weight indicating an addition reliability of a pixel unit. That is, a correction of the motion compensation is determined between the standard image and the motion-compensated image (MC image), and then the addition weight in which the addition ratio of the motion-compensated image (MC image) 22 is increased is calculated as setting the reliability of the correct pixels for the motion compensation to be high. A map indicating the value of the addition weight by a pixel unit is an addition determination map 23 shown in FIG.

2. The process of step S12 is a process performed by the addition determination unit 14 shown in FIG. 1.

Thereafter, in step S13, the standard image all and the motion-compensated image (MC image) 22 are subjected to an addition process by applying the addition weight (the addition determination map 23) calculated for each corresponding pixel. This process is performed by the addition processing unit 15 shown in FIG. 1. An image (standard image+MC image) generated by this addition process is a standard image b24 shown in the lowermost part of FIG. 2.

The standard image b24 is stored in the frame memory 11 and is combined with a reference image B31 which is photographed at a timing after the reference image A21, and then the processes of step S14 to step S16 are performed. The processes of step S14 to step S16 are the same as those of step S11 to step S13.

That is, in step S14, a motion-compensated image (MC image) 32 is generated by applying the standard image b24 and the reference image B31.

In step S15, an addition determination map 33 is generated by applying the standard image b24 and the motion-compensated image (MC image) 32.

In step S16, a standard image c34 which is the standard image+the MC image is generated by adding the standard image b24 and the motion-compensated image (MC image) 32 applying the addition determination map 33.

The standard image c34 is stored in the frame memory 11 and is combined with a reference image C41 which is photographed at a timing after the reference image B31, and then the processes of step S17 to step S19 are performed. The processes of step S17 to step S19 are the same as those of step S11 to step S13.

That is, in step S17, a motion-compensated image (MC image) 42 is generated by applying the standard image c34 and the reference image C41.

In step S18, an addition determination map 43 is generated by applying the standard image c34 and the motion-compensated image (MC image) 42.

In step S19, a noise-reduced image (NR image) 44 which is the standard image+the MC image is generated by adding the standard image c34 and the motion-compensated image (MC image) 42 applying the addition determination map 43.

In the processing example shown in FIG. 2, the noise-reduced image (NR image) 44 is generated by applying the three reference images A to C, but this example is just an example. The processes of step S11 to step S13 may be repeated by applying more reference images repeatedly.

Figure 3:
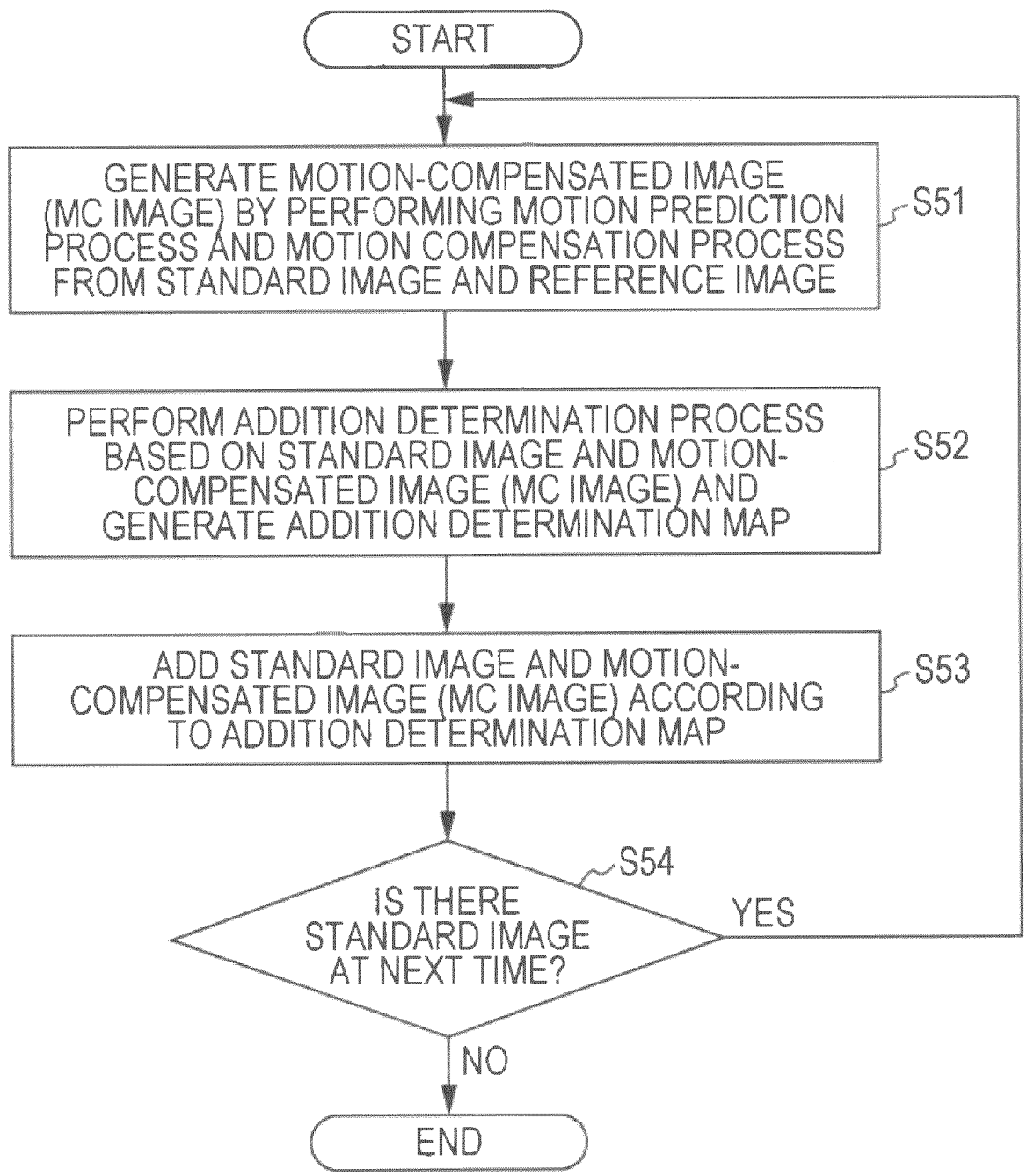
FIG. 3 is a flowchart illustrating an order of the process of generating the noise-reduced image.

A generation sequence of the noise-reduced image (NR image) performed by the image processing apparatus shown in FIG. 1 will be described with reference to the flowchart shown in FIG. 3. The processes of step S51 to S53 in the flowchart shown in FIG. 3 respectively correspond to the processes of step S11 to step S13 shown in FIG. 2.

First, in step S51, the motion vector MV is calculated by applying the standard image and the reference image, and then the motion-compensated image (MC image) is generated in the motion compensation process of the reference image by applying the calculation motion vector MV.

Next, in step S52, the addition determination map is generated by performing the addition determination process of comparing the standard image to the motion-compensated image (MC image) and calculating the addition weight indicating the addition reliability of a pixel unit.

Then, in step S53, a process is performed to add the standard image and the motion-compensated image (MC image) according to the addition determination map for each corresponding pixel. The standard image or the noise-reduced image (NR image) corresponding to the standard image+the MC image shown in FIG. 2 is generated in the addition process.

After the process of step S53, the process proceeds to step S54. In step S54, it is determined whether there is a further executable reference image. For example, the executable reference image refers to an image which is photographed at another time and including the same subject as that of the standard image. Specifically, for example, the executable reference image is continuously photographed images. When there is the executable reference image, the process returns to step S51 and the processes of step S51 to step S53 are repeated by applying this reference image and the standard image corresponding to the standard image+the MC image generated in step S53.

When there is no executable reference image in step S54, an added image finally generated in step S53 is output as the noise-reduced image (NR image).

Figure 4:
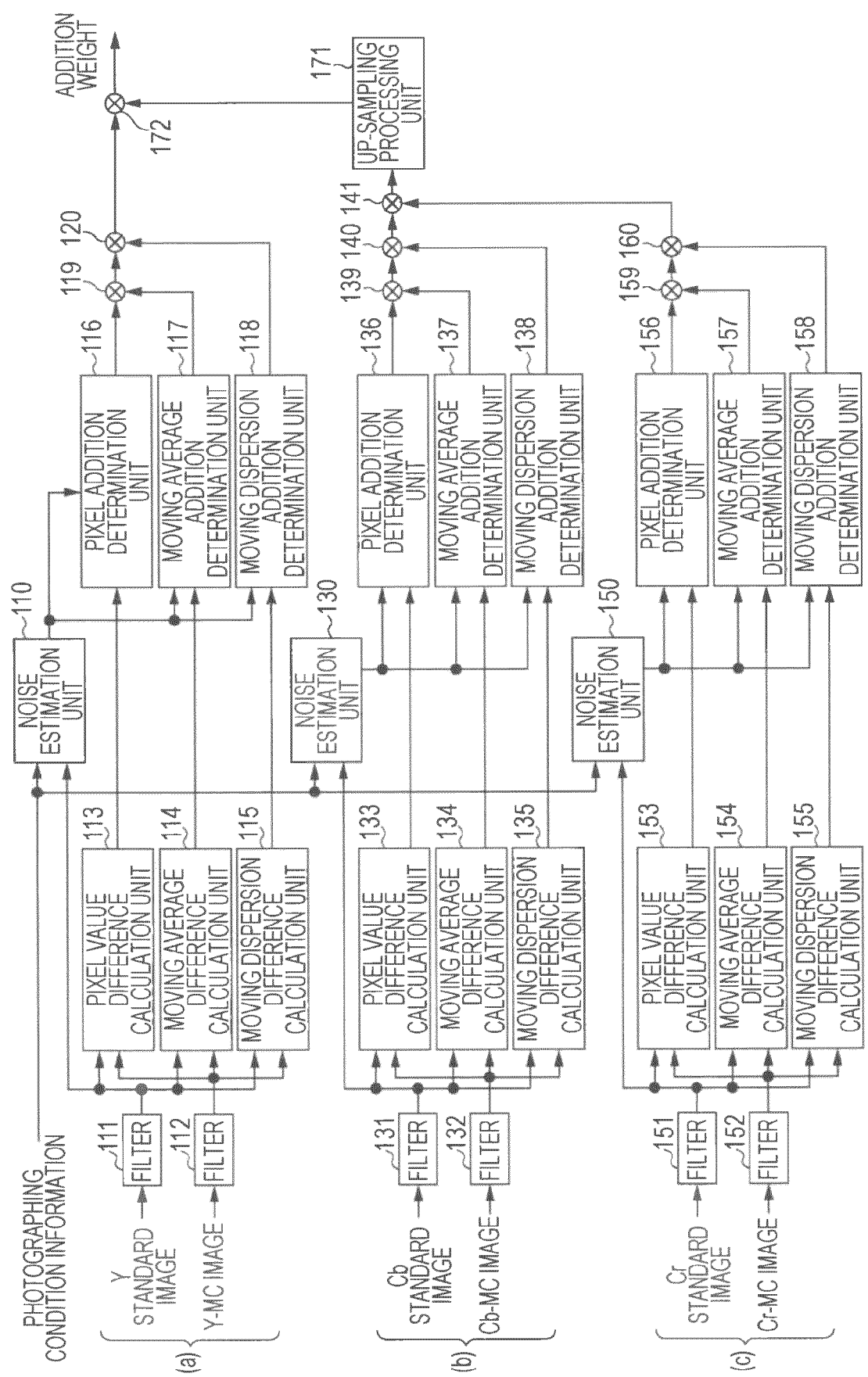
FIG. 4 is a diagram illustrating an exemplary specific configuration of an addition determination unit.

(1b) Configuration and Process of Addition Determination Unit and Addition Processing Unit Next, the detailed configuration and the process of the addition determination unit 14 and the addition processing unit 15 of the image processing apparatus 10 shown in FIG. 1 will be described with reference to FIG. 4 and the like.

First, the detailed configuration and process of the addition determination unit 14 of the image processing apparatus 10 shown in FIG. 1 will be described with reference to FIG. 4. FIG. 4 is a diagram illustrating an exemplary configuration of the addition determination unit 14. As shown in FIG. 4, the addition determination unit 14 has almost the same determination processing configurations corresponding to a luminance signal Y and two color difference signals Cb and Cr. The addition determination unit 14 includes (a) a luminance signal Y determination unit, (b) a color difference signal Cb determination unit, and (c) a color difference signal Cr determination unit shown in FIG. 4.

First, the configuration of the luminance signal Y determination unit shown in part (a) of FIG. 4 will be described. Pixel data at the spatially same position as that of the standard image and the motion-compensated image (MC image) is supplied to a pixel value difference calculation unit 113 via filters 111 and 112 so that a difference between the pixel values is calculated and a difference absolute value is calculated. The filters 111 and 112 cut a high-frequency component in an image to improve an addition determination effect. The pixel value difference calculation unit 113 calculates difference absolute values of the pixel data at the spatially same positions as those of the standard image and the motion-compensated image (MC image) and supplies the difference absolute values to a pixel addition determination unit 116.

A signal output from a noise estimation unit 110 is supplied to the pixel addition determination unit 116. A luminance signal Y of the standard image is input to the noise estimation unit 110 via the filter 111 to estimate the amount of noise corresponding to the pixel value. The photographing condition information regarding a photographing mode, an exposure time, gain information, or the like having an influence on the noise amount in the image is input from the outside to the noise estimation unit 110. The noise estimation unit 110 has, as a table, relationship data between the noise amount and a luminance value measured in advance under each condition. The noise estimation unit 110 obtains the relationship between the luminance value of the corresponding condition and the noise amount from the table and outputs the noise amount corresponding to the input luminance value to the pixel addition determination unit 116, the moving average addition determination unit 117, and the moving dispersion addition determination unit 118.

For example, when the exposure time is longer, random noise tends to increase. Moreover, as a gain for amplifying an imaging signal increases, the random noise tends to increase. Therefore, a table of the pixel value and the noise amount which correspond to each shutter speed and/or gain is generated and prepared using information regarding the shutter speed and/or the gain as the photographing condition. Moreover, a photographing mode of an imaging apparatus may be used as the photographing condition. The photographing condition is set for, for example, each frame.

Figure 5:
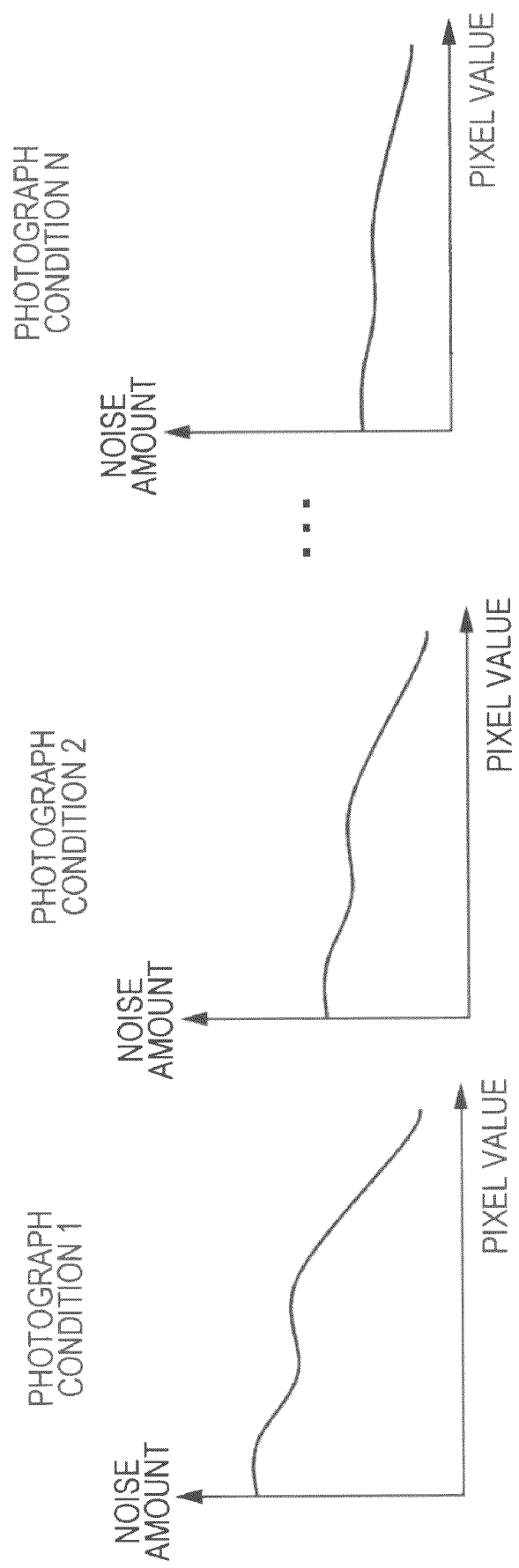
FIG. 5 is a diagram illustrating an example of a noise determination table as a table indicating a correspondence relationship between a pixel value and a noise amount maintained by a noise estimation unit of the addition determination unit.

FIG. 5 is a diagram illustrating an example of a noise determination table as the table indicating a correspondence relationship between the pixel value and the noise amount maintained by the noise estimation unit 110. The relationships between the pixel values and the noise amounts are defined under a plurality of different photographing conditions from photographing condition 1 to photographing condition N. The noise estimation unit 110 inputs the photographing mode, the shutter speed (exposure time), the gain, or the like having an influence on the noise amount in an image as the photographing condition information from a control unit of a camera, acquires the relationship between the luminance value and the noise amount under the corresponding condition from the data of the relationship between the noise amount and the luminance value measured in advance under each photographing condition, and outputs the noise amount corresponding to the luminance value input under the corresponding photographing condition.

A difference absolute value between the noise amount from the noise estimation unit 110 and the pixel value (luminance) from the pixel value difference calculation unit 113 is supplied to the pixel addition determination unit 116. The difference absolute value is an input index value for the pixel addition determination unit 116. The pixel addition determination unit 116 outputs the addition weight which is the addition reliability corresponding to the index value.

FIG. 6A is a diagram illustrating an example of the pixel addition determination unit. The pixel addition determination unit 116 corresponding to the luminance Y includes a noise amount/determination threshold value conversion unit 201 converting the noise amount input from the noise estimation unit 110 into a determination threshold value, a determination curve generation unit 202, and an addition determination unit 203. The noise amount/determination threshold value conversion unit 201 converts the noise amount into the determination threshold value using a table determined based on visual characteristics, and outputs the determination threshold value. The shape of a determination curve is determined depending on the determination threshold value. The determination curve has a shape indicating correspondence between the input index value indicating an error amount and the addition weight indicating reliability for an error.

FIG. 6B is a diagram illustrating several examples of a usable determination curve. The horizontal axis of a graph of each curve represents the input index value and the vertical axis thereof represents the addition weight for the index value. In each curve, the value of the index value for which the addition weight varies from 1 and the value of the index value for which the addition weight becomes 0 are the determination threshold value. The size of the determination threshold value is a value corresponding to the noise amount. When the noise amount is large, the determination threshold value is a larger index value.

The determination curve generation unit 202 determines and outputs the determination curve using the determination threshold value output from the noise amount/determination threshold value conversion unit 201. The determination curve is configured as, for example, a table and is stored in a memory. The addition determination unit 203 inputs the index value using the determination curve and outputs the addition weight corresponding to this index value. The pixel addition determination unit 116 supplies the addition weight to a multiplier 119. The series of conversion, calculation, and determination of the pixel addition determination unit 116 is performed by a pixel unit, since the determination curve generated using the noise amount corresponding to the pixel value by a pixel unit is used.

In the example of the determination curve shown in FIG. 6B, the output (the addition weight for the index value) is 1 for the index value up to a determination threshold value 1 and the addition weight gradually decreases toward 0 for the index value from the determination threshold value 1 to a determination threshold value 2. The shape of the determination curve is defined by the determination threshold value 1 and the determination threshold value 2. When the noise amount is large, the index value corresponding to the determination threshold value 1 and the determination threshold value 2 is a large value. In the determination curve shown in FIG. 6B, the input index value is varied and output according to the corresponding addition weight.

The addition weight output from the pixel addition determination unit 116 is supplied to the multiplier 119 and is multiplied by the addition weight calculated in the same way as that of the above-described difference absolute value of the pixels with regard to a moving average of the luminance signals. The output of the multiplier 119 is supplied to a multiplier 120 and is multiplied by the addition weight calculated in the same way as that of the above-described difference absolute value of the pixels with regard to a moving dispersion of the luminance signals. The output of the multiplier 120 is supplied to a multiplier 172 to be multiplied by the addition weight calculated with regard to the pixel of a color signal, the moving average, and the moving dispersion. The addition weight generated by the addition determination unit 14 is output from the multiplier 172. The addition weight is supplied to the addition processing unit 15.

Next, a case will be described in which the index value is a moving average difference absolute value and a moving dispersion difference absolute value of the luminance signals. As shown in FIG. 4, the pixel data at the spatially same positions as those of the standard image and the motion-compensated image (MC image) are supplied to a moving average difference calculation unit 114 and a moving dispersion difference calculation unit 115 via the filters 111 and 112, respectively.

The moving average difference calculation unit 114 calculates a difference of the moving average of pixel values in a rectangular region centered at a pixel (central pixel) to be calculated, for example, a region of (5×5) pixels. First, the moving average is calculated by shifting the rectangular region while overlapping the rectangular region with a calculation region of the previous pixel in response to the movement of the central pixel in each of the standard image and the motion-compensated image (MC image). Thereafter, a difference of the moving average is calculated for each corresponding pixel of each image.

The moving dispersion difference calculation unit 115 calculates a dispersion of the pixel values in a region of the rectangular region centered at the pixel (central pixel) to be calculated. The moving dispersion is calculated by shifting the rectangular region while overlapping the rectangular region with a calculation region of the previous pixel in response to the movement of the central pixel. Thereafter, a difference of the moving dispersion is calculated for each corresponding pixel of each image.

The reason for calculating the addition weights for the moving average and the moving dispersion is to reduce the noise amount more precisely. For example, when the moving averages or the moving dispersion of the regions of the plurality of pixels are different, determining that the images are different is more correct in many cases, rather than determining the difference absolute value of the pixel values as noise.

The moving average difference calculation unit 114 outputs the absolute value of a moving average difference signal. The moving dispersion difference calculation unit 115 outputs the absolute value of a moving dispersion difference signal. The absolute value of the moving average difference signal and the absolute value of the moving dispersion difference signal are supplied to the moving average addition determination unit 117 and the moving dispersion addition determination unit 118, respectively.

The output signal of the noise estimation unit 110 is supplied to the moving average addition determination unit 117 and the moving dispersion addition determination unit 118. The moving average addition determination unit 117 and the moving dispersion addition determination unit 118 have the same configuration as that of the pixel addition determination unit 116 (see FIG. 6A) and generate the determination curve (table) using the determination threshold value converted from the noise amount. When the moving average difference absolute value and the moving dispersion difference absolute value are given as the index values of the determination curves, the addition weights are calculated. The addition weight of the luminance signal from the moving average addition determination unit 117 is supplied to the multiplier 119 and is multiplied by the output of the pixel addition determination unit 116. The multiplication result is further multiplied by the addition weight of the luminance signal from the moving dispersion addition determination unit 118 by the multiplier 120.

The above-described process is a process of calculating the addition weights as the index values using the pixel difference absolute value, the moving average difference absolute value, and the moving dispersion difference absolute value of the luminance signal. Likewise, the addition weight is calculated for the color signal. In a case of a component color video signal, a ratio, such as (4:2:0), (4:2:2), or (4:1:1), among the sampling frequency for the luminance signal Y, the sampling frequency for the color difference signal Cb, and the sampling frequency for the color difference signal Cr is shown. The addition weight is calculated with regard to the color difference signals Cb and Cr, as in the above-described luminance signal Y.

The luminance signal and the color difference signals Cb and Cr are subjected to the process of generating the addition weight for the same region on an image. As known from the above-described ratio among the sampling frequencies, the number of addition weights calculated for the color difference signals Cr and Cb lacks compared to the addition weight calculated for the luminance signal Y. In order to solve this problem, an up-sampling processing unit 171 is provided to perform interpolation. The addition weight regarding a color difference signal from the up-sampling processing unit 171 is supplied to the multiplier 172 and is multiplied by the addition weight regarding the luminance signal.

The processing for the color difference signal Cb will be described. The color difference signal Cb of the standard image is supplied to the noise estimation unit 130 via the filter 131. The photographing condition information is supplied to the noise estimation unit 130. The noise estimation unit 130 calculates an estimated value of the noise amount corresponding to the color difference signal Cb of the standard image based on a table indicating a relationship between the pixel value corresponding to each photographing condition and the noise amount, as in the noise estimation unit 110 for the luminance signal. The noise estimation unit 130 outputs the estimated value of the noise amount to a pixel addition determination unit 136, a moving average addition determination unit 137, and a moving dispersion addition determination unit 138.

The color difference signal Cb of the standard image and the color difference signal Cb of the motion-compensated image (MC image) are supplied to a pixel value difference calculation unit 133 via the filters 131 and 132, respectively, so that the difference in the pixel value is calculated and the difference absolute value is calculated. The pixel value difference calculation unit 133 calculates the difference absolute values of the pixel data at the spatially same position as those of the standard image and the motion-compensated image (MC image) and supplies the difference absolute values to the pixel addition determination unit 136.

The pixel addition determination unit 136 has the same configuration as the configuration, which is described with reference to FIG. 6, of the pixel addition determination unit 116 corresponding to the luminance signal Y. The pixel addition determination unit 136 includes a noise amount/determination threshold value conversion unit 201 converting the noise amount input from the noise estimation unit 130 into the determination threshold value, a determination curve generation unit 202, and an addition determination unit 203. For example, the input index value is converted into the corresponding addition weight according to the determination curve shown in FIG. 6B, and then is output. The pixel addition determination unit 136 outputs the addition weight which is the addition reliability corresponding to the index value (pixel difference absolute value).

Next, a case will be described in which the index value is the moving average difference absolute value and the moving dispersion difference absolute value of the color difference signal Cb. The pixel data at the spatially same positions as those of the standard image and the motion-compensated image (MC image) are supplied to the moving average difference calculation unit 134 and the moving dispersion difference calculation unit 135 via the filters 131 and 132, respectively.

The moving average difference calculation unit 134 calculates a difference of the moving average of the pixel values in a rectangular region centered at a pixel (central pixel) to be calculated, for example, a region of (5×5) pixels. First, the moving average is calculated by shifting the rectangular region while overlapping the rectangular region with a calculation region of the previous pixel in response to the movement of the central pixel in each of the standard image and the motion-compensated image (MC image). Thereafter, a difference of the moving average is calculated for each corresponding pixel of each image.

The moving dispersion difference calculation unit 135 calculates a dispersion of the pixel values in a region of the rectangular region centered at the pixel (central pixel) to be calculated. The moving dispersion is calculated by shifting the rectangular region while overlapping the rectangular region with a calculation region of the previous pixel in response to the movement of the central pixel. Thereafter, a difference of the moving dispersion is calculated for each corresponding pixel of each image.

The reason for calculating the addition weights for the moving average and the moving dispersion is to reduce the noise amount more precisely. The moving average difference calculation unit 134 outputs the absolute value of a moving average difference signal. The moving dispersion difference calculation unit 135 outputs the absolute value of a moving dispersion difference signal. The absolute value of the moving average difference signal and the absolute value of the moving dispersion difference signal are supplied to the moving average addition determination unit 137 and the moving dispersion addition determination unit 138, respectively.

The output signal of the noise estimation unit 130 is supplied to the moving average addition determination unit 137 and the moving dispersion addition determination unit 138. The moving average addition determination unit 137 and the moving dispersion addition determination unit 138 have the same configuration as that of the pixel addition determination unit 136 (see FIG. 6A) and generate the determination curve (table) using the determination threshold value converted from the noise amount. When the moving average difference absolute value and the moving dispersion difference absolute value are given as the index values of the determination curves, the addition weights are calculated. The addition weight of the color difference signal Cb from the moving average addition determination unit 137 is supplied to the multiplier 139 and is multiplied by the output of the color difference signal Cb of the pixel addition determination unit 116. The multiplication result is further multiplied by the addition weight of the luminance signal of the color difference signal Cb from the moving dispersion addition determination unit 138 by a multiplier 140.

The other color difference signal Cr has the same configuration as that of the above-described color difference signal Cb. That is, the addition weight in which the pixel difference absolute value of the color difference signal Cr is used as an index value can be calculated by the filters 151 and 152, the noise estimation unit 150, the pixel value difference calculation unit 153, and the pixel addition determination unit 156. The addition weight in which the moving average difference absolute value of the color difference signal Cr is used as an index value can be calculated by the filters 151 and 152, the noise estimation unit 150, the moving average difference calculation unit 154, and the moving average addition determination unit 157. The addition weight in which the moving dispersion difference absolute value of the color difference signal Cr is used as an index value can be calculated by the filters 151 and 152, the noise estimation unit 150, the moving dispersion difference calculation unit 155, and the moving average addition determination unit 158.

The addition weight in which the pixel difference absolute value is used as an index value and the addition weight in which the moving average difference absolute value is used as an index value are multiplied by a multiplier 159, and the output of the multiplier 159 and the addition weight in which the moving dispersion difference absolute value is used as an index value are multiplied by a multiplier 160. The addition weight regarding the color difference signal Cr output from the multiplier 160 and the addition weight regarding the above-described color difference signal Cb are multiplied by a multiplier 141. The output from the multiplier 141 is supplied to the up-sampling processing unit 171. The up-sampling processing unit 171 interpolates the addition weight of a color difference according to a color difference format and aligns the point with the luminance addition weight. The output of the up-sampling processing unit 171 and the output of the multiplier 120 are multiplied by the multiplier 172. The output of the multiplier 172 is an addition weight indicating the final reliability of a pixel of interest. The addition weight represents the reliability of each of a luminance pixel, a luminance moving average, a luminance moving dispersion, a color different pixel, a color difference moving average, and a color difference moving dispersion. The addition weight is expressed as a continuous value from 0 to 1.

Next, the detailed configuration and process of the addition processing unit 15 of the image processing apparatus 10 shown in FIG. 1 will be described with reference to FIG. 7. The motion-compensated image (MC image), the standard image, and addition weight information from the addition determination unit 14 are input to the addition processing unit 15.

The addition weight which is output from the addition processing unit 15 is multiplied by a return coefficient (w) by a multiplier 251. For example, when the return ratio is set to 1/3 and when the addition weight varies from 0 to 1, the weight of the weighted average for the motion-compensated image (MC image) varies from 0 to 1/3.

A coefficient (indicated by $\alpha$) output from the multiplier 251 is supplied to the multiplier 252 and is multipliable to the motion-compensated image (MC image).

The coefficient $\alpha$ is supplied to a subtracter 253 to generate $(1-\alpha)$. Then, $(1-\alpha)$ is supplied to a multiplier 254 and is multipliable to a standard image (Cur image), The outputs of the multiplier 252 and the multiplier 254 are added by an adder 255, and the noise-reduced image (NR image) is output from the adder 255.

The noise-reduced image (NR image) as the addition result of the motion-compensated image (MC image) and the standard image generated by the addition processing unit 15 may also be stored in the frame memory 11. This noise-reduced image as a new standard image is combined with a new reference image and can be repeatedly subjected to the same processes as the above-described processes.

For example, the addition result of the motion-compensated image (MC image) and the standard image generated by the addition processing unit 15 can be output as the final noise-reduced image (NR image) after the process is repeated by a predetermined number of times.

However, for example, when there is a moving object such as a car or a person indicating a motion different from the background in an image, the moving object sometimes indicates a motion different from the motion vector calculated by the motion prediction processing unit 12. That is, an image region occurs which indicates a motion which does not match with the motion vector generated by the motion prediction processing unit 12. This region is called a motion estimation (ME) failure region. On the other hand, an image region indicating a motion which matches with the motion vector generated by the motion prediction processing unit 12 is called a motion estimation (ME) success region. When the motion estimation (ME) failure region is included, an exact motion-compensated image (MC image) is not generated.

The addition determination unit performs a comparison process of the corresponding pixels between the standard image and the motion-compensated image (MC image), for example, calculates a pixel value difference. However, the pixel value difference may become a large value in the motion estimation (ME) failure region. In the processing of the addition determination unit 14 described in the above lists (1a) and (1b), this pixel value difference may not be determined to be a difference caused due to an inexact (deteriorating) motion-compensated image (MC image) by the motion estimation (ME) failure or a difference caused due to strong noise. In this case, an erroneous addition weight may be output and may result in generating a noise-reduced image from which noise is not sufficiently reduced.

(2) Example of Image Processing Apparatus Generating Noise-Reduced Image by Applying Detection Information of High Precision Motion Region According to Embodiment of the Invention Hereinafter, an embodiment of the invention will be described in which the image processing apparatus has a configuration capable of detecting the motion region and preventing the addition process of the erroneous corresponding pixels between the standard image and the motion-compensated image (MC image) in order to solve the above problem and generating a high-quality noise-reduced image.

(2a) Overall Configuration of Image Processing Apparatus

Figure 8:
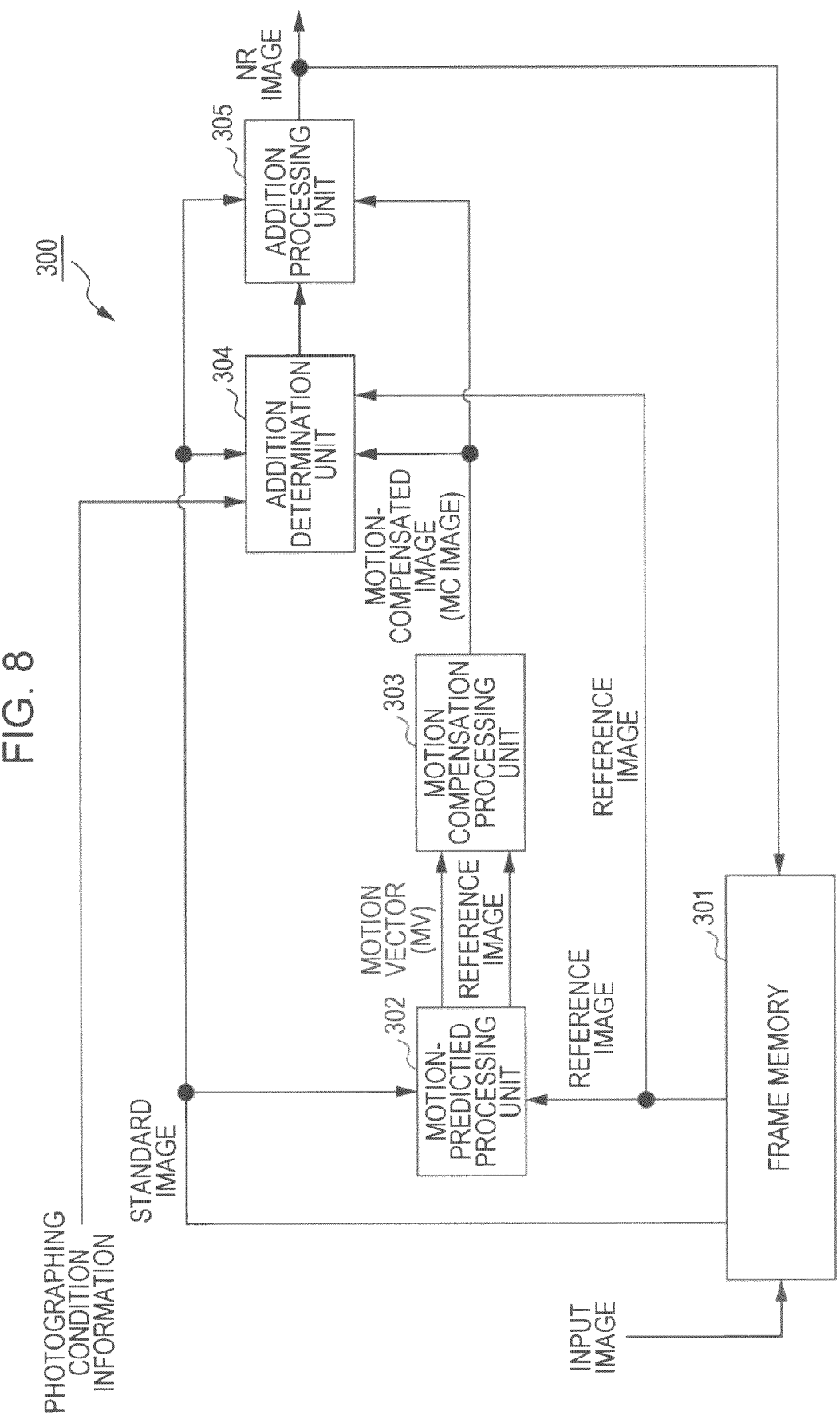
FIG. 8 is a diagram illustrating an exemplary configuration of an image processing apparatus according to an embodiment of the invention.

The overall configuration of the image processing apparatus according to the embodiment of the invention is shown in FIG. 8. As shown in FIG. 8, the overall configuration of an image processing apparatus 300 according to the embodiment of the invention has almost the same configuration as the configuration described above with reference to FIG. 1. That is, the image processing apparatus 300 includes a frame memory 301, a motion prediction processing unit 302, a motion compensation processing unit 303, an addition determination unit 304, and an addition processing unit 305, as shown in FIG. 8. Photographed images are sequentially stored as input images in the frame memory 301.

The input image is an image including noise. The image processing apparatus 300 shown in FIG. 8 reduces the noise from the input image and the addition processing unit 305 shown in FIG. 8 finally outputs a noise-reduced image (NR image).

The frame memory 301, the motion prediction processing unit 302, the motion compensation processing unit 303, and the addition processing unit 305 of the image processing apparatus 300 according to the embodiment of the invention have the same configurations and processes as those described with reference to FIGS. 1 to 7, and perform the same processes. However, the addition determination unit 304 has the configuration and process different from those described with reference to FIGS. 1 to 7.

A standard image and a reference image are input from the frame memory 301 to the motion prediction processing unit 302. The standard image refers to an image to be subjected to a noise reduction process. The reference image refers to an image which is applied in the noise reduction process for the standard image. For example, a motion vector is calculated from the standard image and the reference image. The noise reduction process for the standard image is performed by applying a plurality of continuously photographed reference images.

For example, a noise-reduced image generated by applying one standard image and one reference image is restored in the frame memory 11, and this noise-reduced image as a new standard image is subjected to a new noise reducing process by applying the subsequent second reference image.

The motion compensation processing unit 303 generates a motion-compensated image (MC image) by performing motion compensation on the standard image or the reference image through the application of the motion vector MV generated by the motion prediction processing unit 302. That is, a motion-compensated image (MC image) is generated by moving a standard image and a reference image so that the position of a subject in the standard image is adjusted with the position of a subject in the reference image. The motion-compensated image (MC image) generated by the motion compensation processing unit 303 is supplied to the addition determination unit 304 and the addition processing unit 305. The motion-compensated image (MC image) may be generated by moving the standard image or may be generated by moving the reference image. In this embodiment described below, an exemplary process of generating the motion-compensated image (MC image) by moving the reference image will be described.

The addition determination unit 304 inputs the motion-compensated image (MC image) generated by the motion compensation processing unit 303, the standard image, and photographing condition information used to estimate the amount of noise. The photographing condition information includes information regarding a photographing mode, an exposure time, a gain, or the like supplied from, for example, an internal microcomputer of a camera and corresponding to an input image (photographed image).

The addition determination unit 304 generates an addition weight used in the addition processing unit 305 by a pixel unit. The addition weight is an addition weight of the motion-compensated image (MC image) for the standard image and indicates reliability of each pixel of the motion-compensated image (MC image). That is, a pixel reducing noise so as not to cause deterioration when determining correction of the motion compensation between the standard image and the motion-compensated image (MC image) and adding the standard image and the motion-compensated image (MC image) is said to have high reliability.

The addition determination unit 304 of the image processing apparatus according to this embodiment of the invention performs a process of detecting a motion region strictly to verify the reliability of the corresponding pixels of the motion-compensated image (MC) added to the standard image more precisely based on the detection result of the motion region.

Specifically, the addition determination unit 304 generates, as motion region detection information, the motion region detection information obtained through integration of the detection information of the motion region based on two different approaches:

(a) motion region detection information [Flat-map] using success determination information of the motion estimation (ME) obtained based on the pixel difference information between the standard image and the motion-compensated image; and (b) motion region detection information [Hit-map] obtained through a process of comparing a global motion vector (GMV) and a local motion vector (LMV).

Using the motion region determination information obtained based on the two different approaches, that is, the detection information regarding a region of a moving subject having a motion different from the motion (global motion) of the entire image, the addition weight is determined by obtaining the reliability of the pixels corresponding to the pixels of the motion-compensated image (MC image), setting the addition weight of the pixels of the motion-compensated image (MC image) with high reliability to be high, and setting the addition weight of the pixels of the motion-compensated image (MC image) with low reliability to be low.

As described above, when the addition process is performed between the pixels of the same portion of the same object of two images photographed at different times, noise which is not correlated with time can be reduced by the addition. However, when a moving subject is included, the pixels of the motion-compensated image (MC image) selected in correspondence with the pixels of the standard image may become pixels at a portion different from the standard image. Therefore, when these pixels are added, the reduction in the noise may not be realized.

In order to prevent this erroneous process, the image processing apparatus according to the embodiment of the invention performs a motion region determination process based on an approach different from the two (a) and (b) and determines the addition weight of the pixels of the motion-compensated image (MC image) based on the determination result.

For example, the addition weight generated by the addition determination unit 304 is set to 0 when the reliability is low, whereas the addition weight is set to 1 when the reliability is high.

The addition processing unit 305 performs an addition process by applying the addition weight calculated for each of the corresponding pixels between the standard image and the motion-compensated image (MC image). The addition processing unit 305 performs the addition process by calculating a weighted average between the standard image and the motion-compensated image (MC image). The weight of the weighted average is a value obtained by multiplying an addition weight by a return ratio. For example, when the return ratio is set to 1/3 and when the addition weight is varied from 0 to 1, the weight for the MC image in the weighted average is varied from 0 to 1/3.

The addition result generated between the standard image and the motion-compensated image (MC image) by the addition processing unit 305 is stored in the frame memory 301. The image as a new standard image is combined with a new reference image and the above-described processes are repeatedly performed. For example, after the processes are repeated a predetermined number of times, the addition result generated between the standard image and the motion-compensated image (MC image) by the addition processing unit 305 is output as the noise-reduced image (NR image).

(2b) Configuration of Addition Determination Unit

Figure 9:
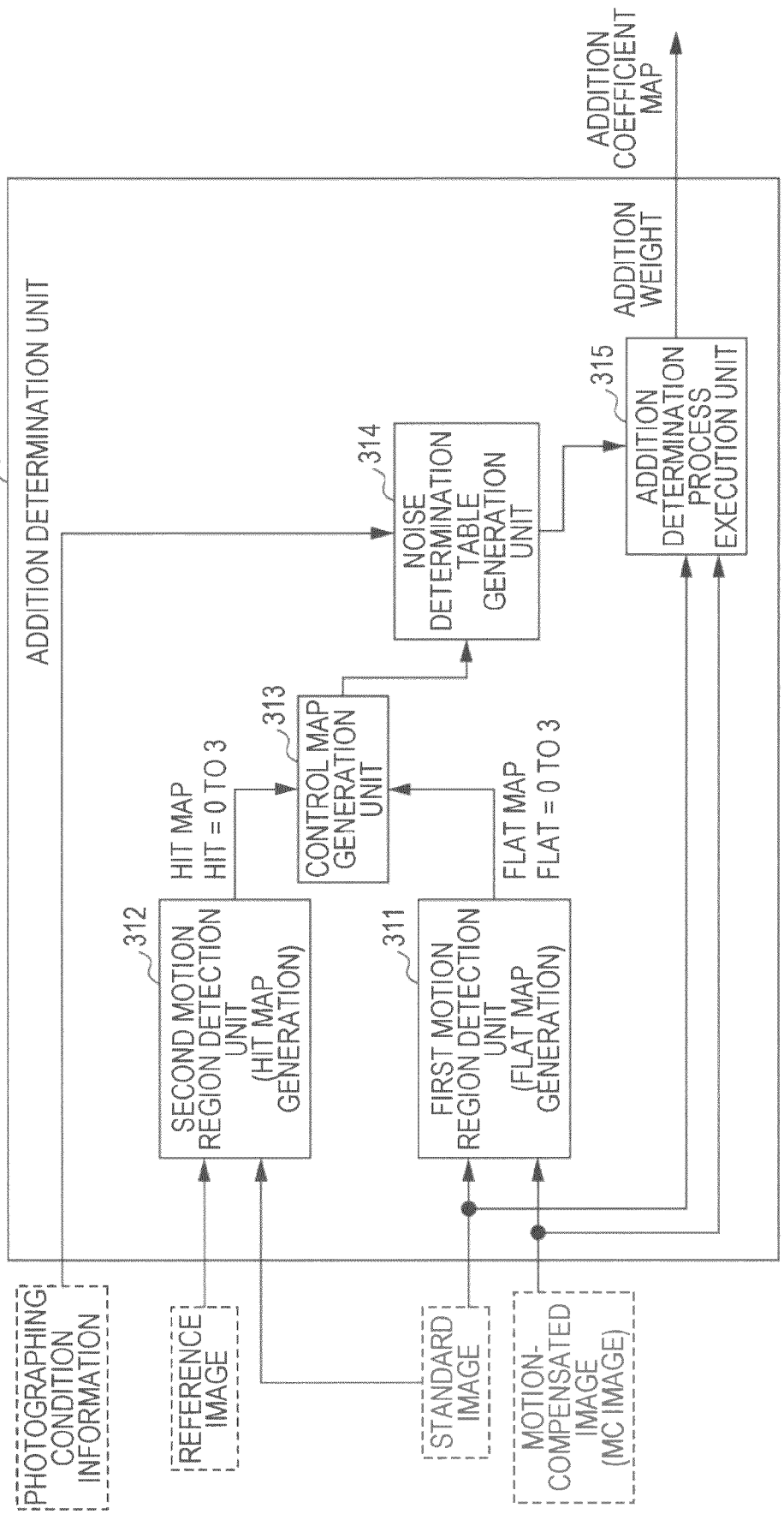
FIG. 9 is a diagram illustrating an exemplary configuration of an addition determination unit of the image processing apparatus according to the embodiment of the invention.

An exemplary specific configuration of the addition determination unit 304 of the image processing apparatus 300 according to the embodiment of the invention is shown in FIG. 9.

As shown in FIG. 9, the addition determination unit 304 of the image processing apparatus 300 according to the embodiment of the invention includes a first motion region detection unit (flat map generation unit) 311, a second motion region detection unit (hit map generation unit) 312, a control map generation unit 313, a noise determination table generation unit 314, and an addition determination process execution unit 315.

The addition determination process execution unit 315 of the addition determination unit 304 has the same configuration as the configuration described above with reference to FIG. 4. The addition determination process execution unit 315 generates the addition weight used in the addition processing unit 305 of the image processing apparatus 300 shown in FIG. 8 by a pixel unit and outputs the addition weight to the addition processing unit 305. The addition weight is an addition weight of the motion-compensated image (MC image) for the standard image and indicates reliability of each pixel of the motion-compensated image (MC image), as described above.

The first motion region detection unit (flat map generation unit) 311 generates the motion detection information [Flat-map] using the success determination information of the motion estimation (ME).

The second motion region detection unit (hit map generation unit) 312 generates the motion region detection information [Hit-map] obtained by the process of comparing the global motion vector (GMV) and the local motion vector (LMV).

The control map generation unit 313 generates motion region detection information obtained by integrating the motion region detection information generated based on the two different approaches: the Flat-map and the Hit-map.

The noise determination table generation unit 314 corrects the noise determination table based on the motion region information generated by the control map generation unit 313. The noise determination table to be corrected is a noise determination table maintained by the noise estimation unit 110 (see FIG. 4) of the addition determination process execution unit 314.

The addition determination process execution unit 315 has the same configuration as the configuration described above with reference to FIG. 4. The addition determination process execution unit 315 calculates the addition weight (the addition weight of the MC image for the standard image) of a pixel unit using the noise determination table generated by the noise determination table generation unit 314. That is, the addition weight used in the addition processing unit 305 of the image processing apparatus 300 shown in FIG. 8 is generated by a pixel unit and is output to the addition processing unit 305.

Hereinafter, the detailed configurations and processes of the processing units of the addition determination unit 304 shown in FIG. 9 will be described sequentially.

(2b-1) Configuration and Process of First Motion Region Detection Unit (Flat Map Generation Unit)

First, the detailed configuration and process of the first motion region detection unit (flat map generation unit) 311 will be described.

The first motion region detection unit (flat map generation unit) 311 generates the motion region detection information [Flat-map] using the success determination information of the motion estimation (ME).

Figure 10:
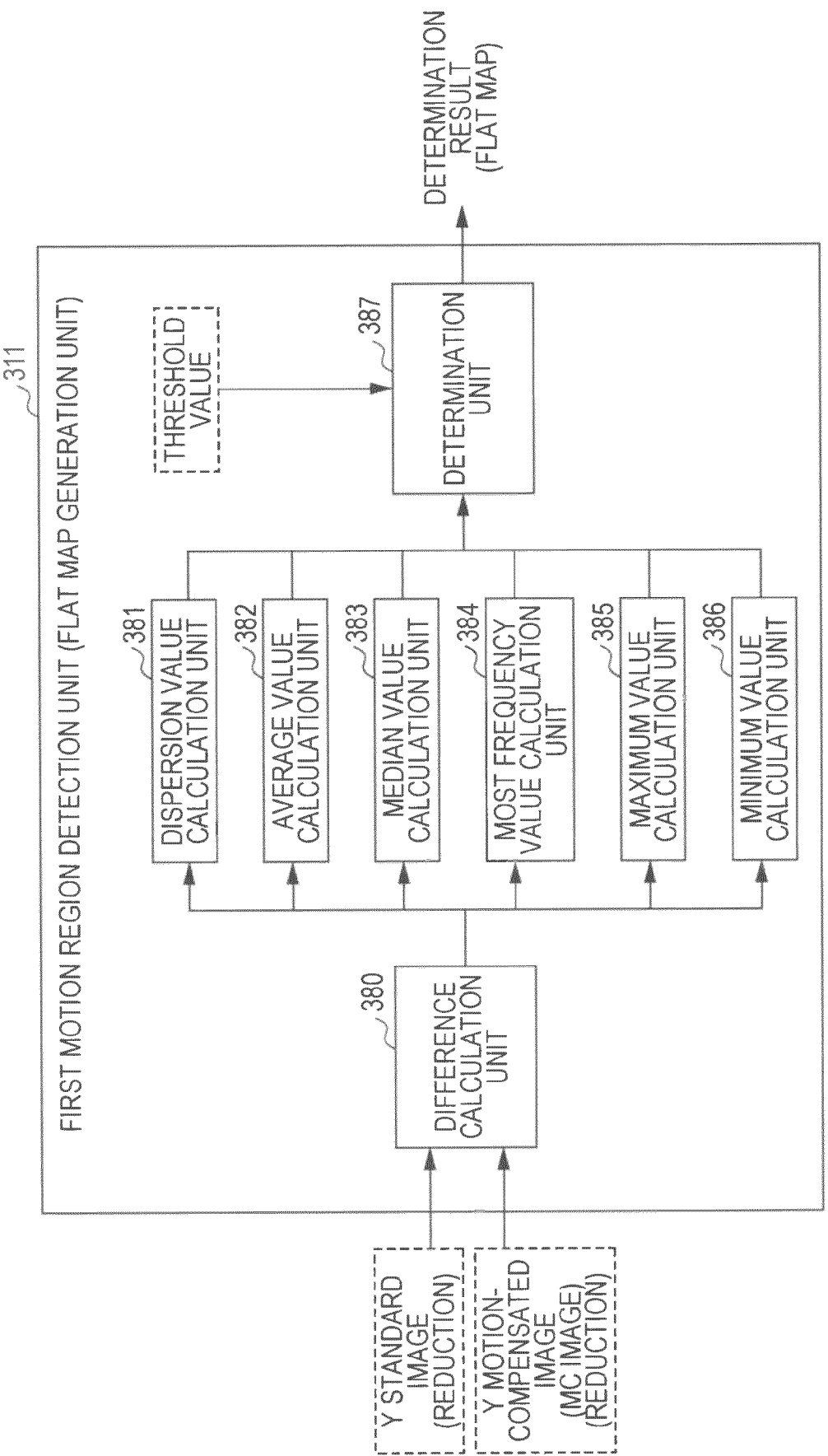
FIG. 10 is a diagram illustrating an exemplary configuration and an exemplary process of a first motion region detection unit set in the addition determination unit.

An exemplary configuration and an exemplary process of the first motion region detection unit 311 will be described below with reference to FIG. 10. FIG. 10 is a diagram illustrating an exemplary configuration of the first motion region detection unit 311. The first motion region detection unit 311 shown in FIG. 10 includes a difference calculation unit 380, a dispersion value calculation unit 381, an average value calculation unit 382, a median value calculation unit 383, a most frequency calculation unit 384, a maximum value calculation unit 385, a minimum value calculation unit 386, and a determination unit 387.

The difference calculation unit 380 inputs pixel value information of corresponding small region (block) located at corresponding position between the standard image and the motion-compensated image (MC image). After reduced images of the standard image and the motion-compensated image (MC image) are generated, a process may be performed for the reduced images. In this embodiment, the luminance value (Y) of each pixel is input. However, a pixel value may be input instead of the luminance value.

Hereinafter, an example will be described in which the luminance values (Y) of the constituent pixels of the corresponding small region between the standard image and the motion-compensated image (MC image) are input. The difference calculation unit 380 calculates a difference between the luminance values (Y) of the constituent pixels of the corresponding small region between the standard image and the motion-compensated image (MC image) and outputs the difference to the dispersion value calculation unit 381, the average value calculation unit 382, the median value calculation unit 383, the most frequency calculation unit 384, the maximum value calculation unit 385, and the minimum value calculation unit 386.

The dispersion value calculation unit 381 to the minimum value calculation unit 386 each output an index value, that is, the motion region determination information used to determine whether the corresponding small region located at the corresponding position between the standard image and the motion-compensated image (MC image) belongs to one of (a) the motion estimation (ME) success region, (b) motion estimation (ME) failure region, and (c) a boundary region.

Therefore, the first motion region detection unit 311 may include one of the dispersion value calculation unit 381 to the minimum value calculation unit 386 or may include a plurality of processing units thereof so that the determination unit 387 acquires a plurality of index values and performs the synthesis determination. Alternatively, the determination unit 387 may perform the determination by selectively applying index values of other processing units depending in the region.

The determination unit 387 outputs the motion region detection information [Flat-map] using the success determination information of the motion estimation (ME).

The flat-map is output as an index value (flat value [Flat]) indicating whether each small region (block) is a motion region by a small region (block) unit formed by, for example, a plurality of pixels.

The range of the flat value is set to be Flat=0 to 3.

The smaller the value of Flat is (closer to 0), the more likely that the small region is a motion region, that is, a region where the motion estimation (ME) of the motion-compensated image (MC image) fails. On the contrary, the larger the value of Flat is (closer to 3), the less likely that the small region is a motion region, that is, a region where the motion estimation (ME) of the motion-compensated image (MC image) succeeds.

First, the process of the dispersion value calculation unit 381 will be described. The dispersion value calculation unit 381 calculates the dispersion of the luminance value (Y) difference of the constituent pixels of the corresponding small region between the standard image and the motion-compensated image (MC image) input from the difference calculation unit 380.

The determination unit 387 determines whether each region belongs to one of (a) the motion estimation (ME) success region, (b) the motion estimation (ME) failure region, and (c) the boundary region based on the dispersion of the difference generated by the dispersion value calculation unit 381.

Figure 11:
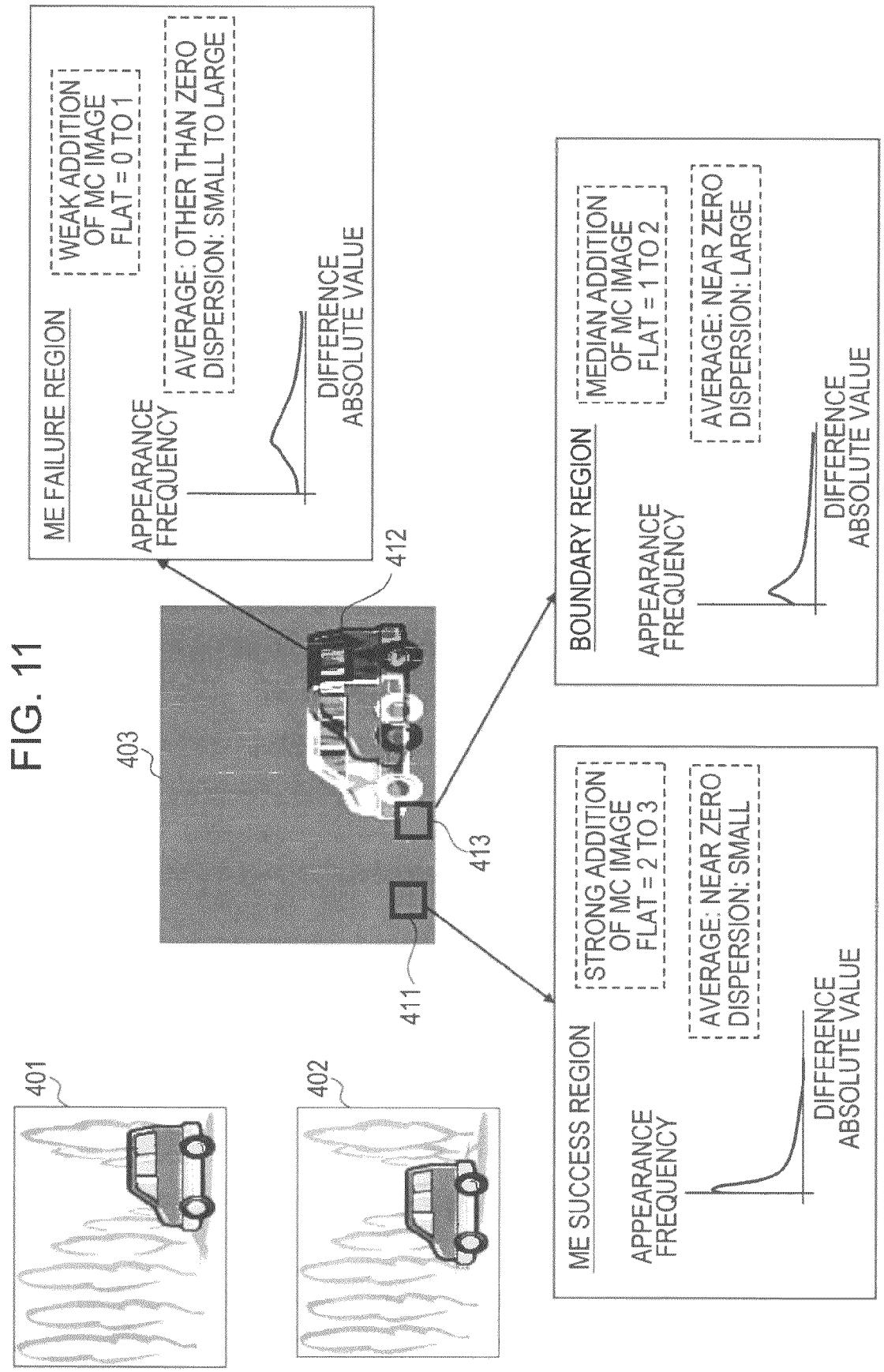
FIG. 11 is a diagram illustrating a determination process based on a dispersion of a difference of pixel values (luminance values).

The determination process based on the dispersion of the pixel value (luminance value) difference will be described with reference to FIG. 11. FIG. 11 is a diagram illustrating a standard image 401, a motion-compensated image (MC image) 402, and a difference image 403 formed from the luminance value difference between the images.

In the difference image 403, a motion estimation (ME) success region 411, a motion estimation (ME) failure region 412, and a boundary region 413 located therebetween are shown. In FIG. 11, difference absolute value distribution data corresponding to each region is also shown.

As understood from the difference absolute value distribution data shown in FIG. 11, the average is near zero and the dispersion is small, so that the distribution is focused on the vicinity of 0 in the difference absolute value distribution data of the motion estimation (ME) success region 411.

A result indicating that the addition weight of the motion-compensated image (MC image) for the standard image is set to be high is output in the motion estimation (ME) success region 411.

Specifically, a flat value (Flat=3) indicating that the addition weight of the motion-compensated image (MC image) is set to be high is output.

The average is other than zero and the dispersion is small to large, so that the distribution is other than 0 in the difference absolute value distribution data of the motion estimation (ME) failure region 412.

A result indicating that the addition weight of the motion-compensated image (MC image) for the standard image has not been set to be high is output in the motion estimation (ME) failure region 412.

Specifically, a flat value (Flat=0) indicating that the addition weight of the motion-compensated image (MC image) is set to be low is output.

The average is near zero and the dispersion is large in the difference absolute value distribution data of the boundary region 413.

A result indicating that the addition weight of the motion-compensated image (MC image) for the standard image is set to be median is output in the motion estimation (ME) boundary region 413.

Specifically, a flat value (Flat=1 to 2) indicating that the addition weight of the motion-compensated image (MC image) is set to be median is output.

The determination unit 387 can calculate the flat value of the block unit by comparing threshold values set in advance to each other in the process of determining the three regions. When there is an index value from another processing unit, the flat value of the final block unit is calculated in consideration of this index value.

The average value calculation unit 382 calculates an average value of the luminance value (Y) differences of the constituent pixels of the corresponding small region (block) between the standard image and the motion-compensated image (MC image) input from the difference calculation unit 380. The average value of the luminance value differences is the largest in (b) the motion estimation (ME) failure region, is the smallest in (a) the motion estimation (ME) success region, and is median in (c) the boundary region.

The determination unit 387 compares the difference average value calculated by the average value calculation unit 382 to the preset threshold value to determine whether each region belongs to one of (a) the motion estimation (ME) success region, (b) the motion estimation (ME) failure region, and (c) the boundary region, and then calculates the flat value of the block unit. When there is an index value from another processing unit, the flat value of the final block unit is calculated in consideration of this index value.

The median value calculation unit 383 calculates a median value of the luminance value (Y) difference of the constituent pixels of the corresponding small region between the standard image and the motion-compensated image (MC image) input from the difference calculation unit 380. Likewise, the median value of the luminance value (Y) difference is the largest in (b) the motion estimation (ME) failure region, is the smallest in (a) the motion estimation (ME) success region, and is median in (c) the boundary region.

The determination unit 387 compares the difference median value calculated by the median value calculation unit 383 to a preset threshold value to determine whether each region belongs to one of (a) the motion estimation (ME) success region, (b) the motion estimation (ME) failure region, and (c) the boundary region, and then calculates the flat value of the block unit. When there is an index value from another processing unit, the flat value of the final block unit is calculated in consideration of this index value.

The most frequency calculation unit 384 calculates the most frequency of the luminance value (Y) difference of the constituent pixels of the corresponding small region between the standard image and the motion-compensated image (MC image) input from the difference calculation unit 380. Likewise, the most frequency is the largest in (b) the motion estimation (ME) failure region, is the smallest in (a) the motion estimation (ME) success region, and is median in (c) the boundary region.

The determination unit 387 compares the difference most frequency calculated by the most frequency calculation unit 384 to a preset threshold value to determine whether each region belongs to one of (a) the motion estimation (ME) success region, (b) the motion estimation (ME) failure region, and (c) the boundary region, and then calculates the flat value of the block unit. When there is an index value from another processing unit, the flat value of the final block unit is calculated in consideration of this index value.

The maximum value calculation unit 385 calculates the maximum value of the luminance value (Y) difference of the constituent pixels of the corresponding small region between the standard image and the motion-compensated image (MC image) input from the difference calculation unit 380. Likewise, the maximum value is the largest in (b) the motion estimation (ME) failure region, is the smallest in (a) the motion estimation (ME) success region, and is median in (c) the boundary region.

The determination unit 387 compares the difference maximum value calculated by the maximum calculation unit 385 to a preset threshold value to determine whether each region belongs to one of (a) the motion estimation (ME) success region, (b) the motion estimation (ME) failure region, and (c) the boundary region, and then calculates the flat value of the block unit. When there is an index value from another processing unit, the flat value of the final block unit is calculated in consideration of this index value.

The minimum value calculation unit 386 calculates the minimum value of the luminance value (Y) difference of the constituent pixels of the corresponding small region between the standard image and the motion-compensated image (MC image) input from the difference calculation unit 380. Likewise, the minimum value is the largest in (b) the motion estimation (ME) failure region, is the smallest in (a) the motion estimation (ME) success region, and is median in (c) the boundary region.

The determination unit 387 compares the difference minimum value calculated by the minimum value calculation unit 386 to a preset threshold value to determine whether each region belongs to one of (a) the motion estimation (ME) success region, (b) the motion estimation (ME) failure region, and (c) the boundary region, and then calculates the flat value of the block unit. When there is an index value from another processing unit, the flat value of the final block unit is calculated in consideration of this index value.

As described above, the determination unit 387 may determine the region by individually applying the index values output from the dispersion value calculation unit 381 to the minimum value calculation unit 386 or may determine the region by a combination of the plurality of index values.

Figure 12:
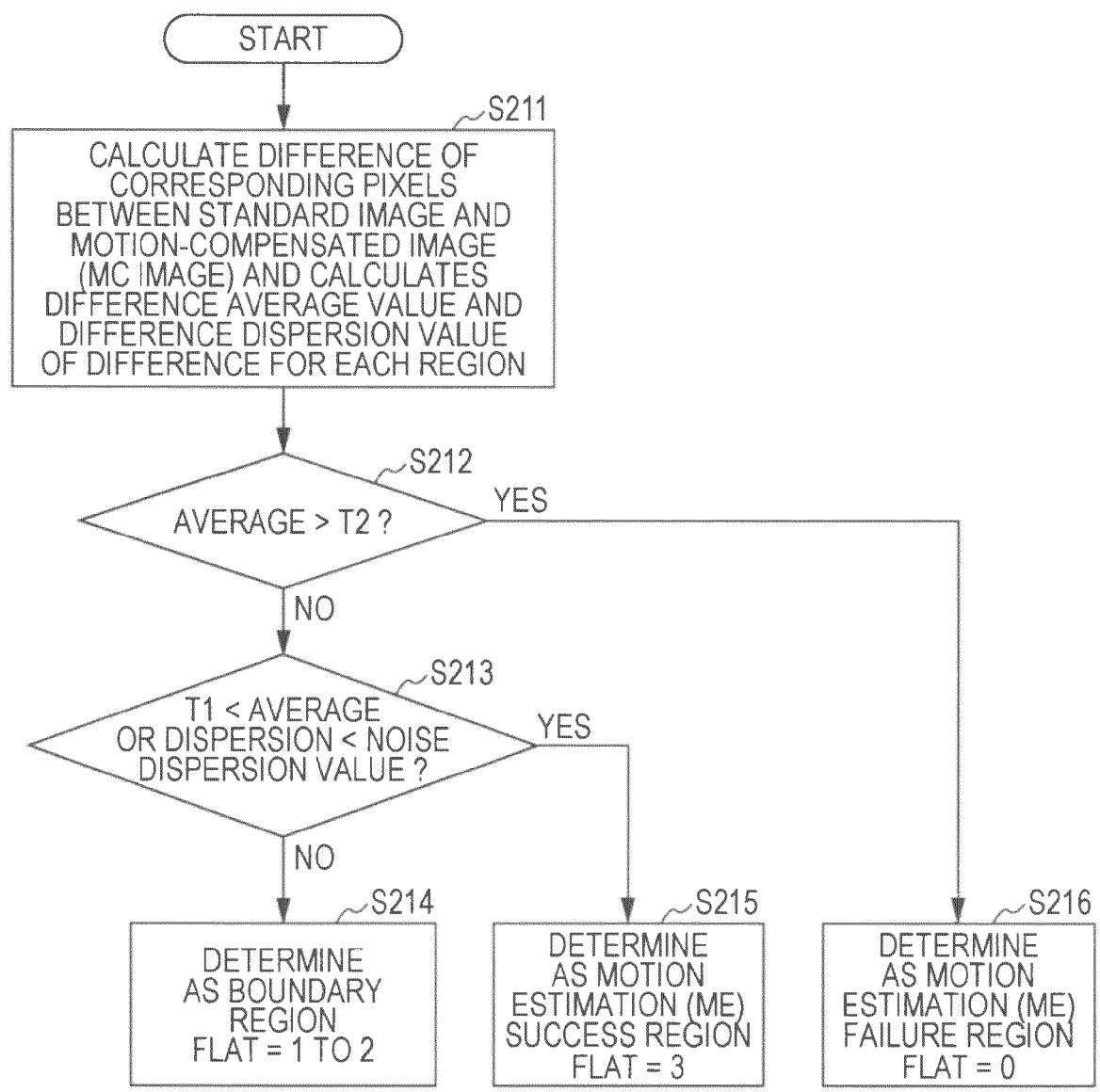
FIG. 12 is a flowchart illustrating an exemplary sequence of a region determination process of the first motion region detection unit set in the addition determination unit.

FIG. 12 is a flowchart illustrating an example of the region determination process of the first motion region detection unit 311. According to the processing sequence of the flowchart, the determination unit 387 determines whether each region belongs to one of (a) the motion estimation (ME) success region, (b) the motion estimation (ME) failure region, and (c) the boundary region using the difference dispersion value generated by the dispersion value calculation unit 381 and the difference average value generated by the average value calculation unit 382.

The processes of the steps of the flowchart shown in FIG. 12 will be described. In step S211, the difference values of the corresponding pixels between the standard image and the motion-compensated image (MC image) are calculated, and then the difference average value and the difference dispersion value are calculated for each region. This process is performed by the difference calculation unit 380, the dispersion value calculation unit 381, and the average value calculation unit 382.

The processes subsequent to step S212 are performed by the determination unit 387. In step S212, the determination unit 387 compares a preset threshold value T2 to the difference average value generated by the average value calculation unit 382.

When the relation of the difference average value >T2 is satisfied, the process proceeds to step S216 and the determination unit 387 determines that this region is the "motion estimation (ME) failure region (Flat=0)."

When the relation of the difference average value >T2 is not satisfied in step S212, the process proceeds to step S213. In step S213, a preset threshold value T1 is compared to the difference average value generated by the average value calculation unit 382, and the difference dispersion value generated by the dispersion value calculation unit 381 is compared to a noise dispersion value calculated based on the preset threshold value or an image.

That is, the determination process is performed based on two relations: the relation of T1<difference average value and the relation of difference dispersion value<noise dispersion value. When the two relations are satisfied, the process proceeds to step S215 and this region is determined as the "motion estimation (ME) success region (Flat=3)."

On the other hand, when the two relations, that is, the relation of T1<difference average value and the relation of difference dispersion value<noise dispersion value are not satisfied in step S213, the process proceeds to step S214 and the region is determined as the "boundary region (Flat=1 to 2)."

Figure 13:
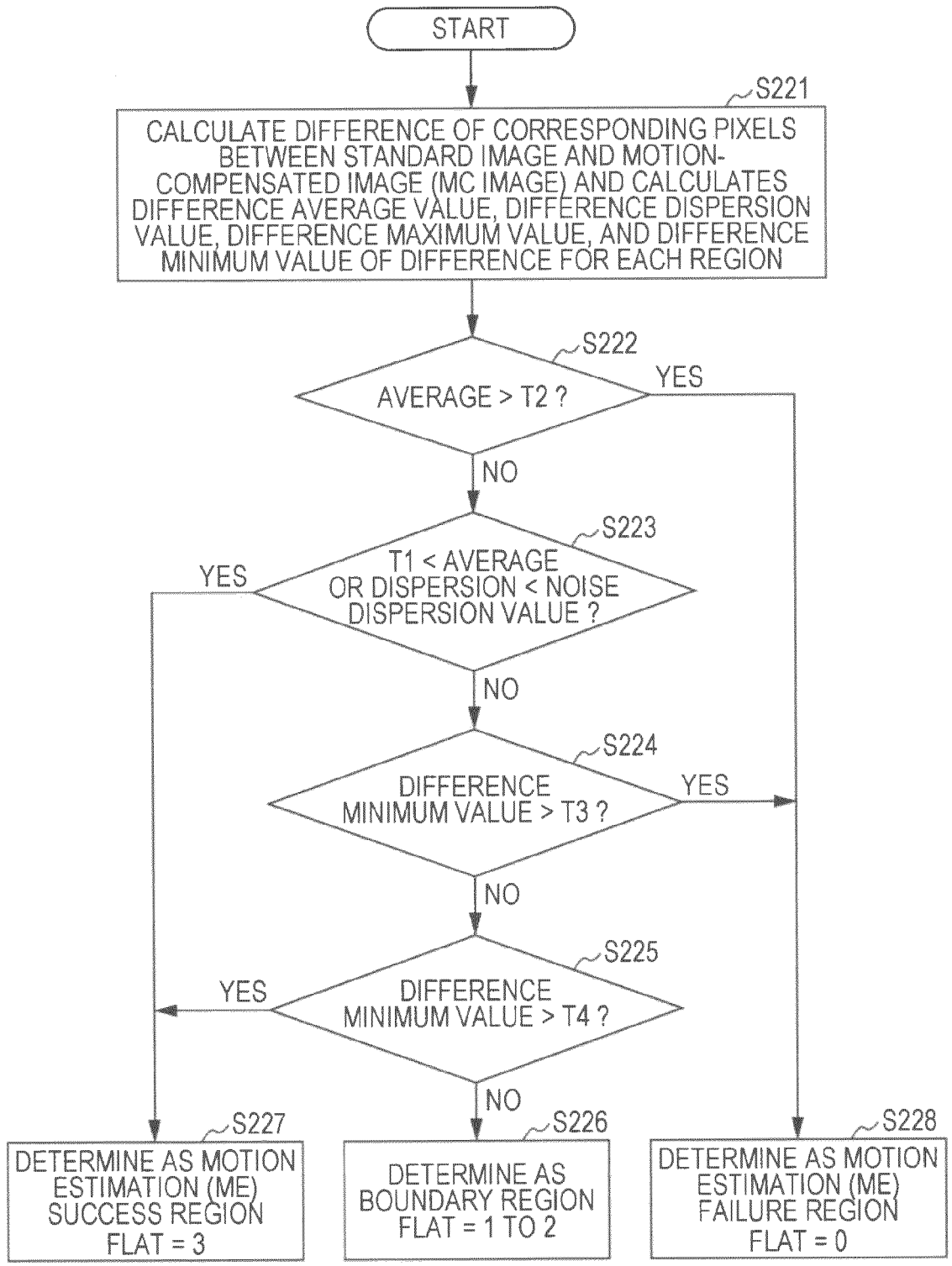
FIG. 13 is a flowchart illustrating an exemplary sequence of a region determination process of the first motion region detection unit set in the addition determination unit.

FIG. 13 is a flowchart illustrating another example of the region determination process of the first motion region detection unit 311. According to the processing sequence of the flowchart, the determination unit 387 determines whether each region belongs to one of (a) the motion estimation (ME) success region, (b) the motion estimation (ME) failure region, and (c) the boundary region using the difference dispersion value generated by the dispersion value calculation unit 381, the difference average value generated by the average value calculation unit 382, the difference maximum value generated by the maximum value calculation unit 385, and the difference minimum value calculated by the minimum value calculation unit 386.

The processes of the steps of the flowchart shown in FIG. 13 will be described. In step S221, the difference values of the corresponding pixels between the standard image and the motion-compensated image (MC image) are calculated, and then the difference average value, the difference dispersion value, the difference maximum value, and the difference minimum value are calculated for each region. This process is performed by the difference calculation unit 380, the dispersion value calculation unit 381, the average value calculation unit 382, the maximum value calculation unit 385, and the minimum value calculation unit 386.

The processes subsequent to step S222 are performed by the determination unit 387. In step S222, the determination unit 387 compares the preset threshold value T2 to the difference average value generated by the average value calculation unit 382.

When the relation of the difference average value >T2 is satisfied, the process proceeds to step S228 and the determination unit 387 determines that this region is the "motion estimation (ME) failure region (Flat=0)."

When the relation of the difference average value >T2 is not satisfied in step S222, the process proceeds to step S223. In step S223, the preset threshold value T1 is compared to the difference average value generated by the average value calculation unit 382, and the difference dispersion value generated by the dispersion value calculation unit 381 is compared to the noise dispersion value calculated based on the preset threshold value or an image.

That is, the determination process is performed based on two relations: the relation of T1<difference average value and the relation of difference dispersion value<noise dispersion value. When the two relations are satisfied, the process proceeds to step S227 and this region is determined as the "motion estimation (ME) success region (Flat=3)."

On the other hand, when the two relations, that is, the relation of T1<difference average value and the relation of difference dispersion value<noise dispersion value are not satisfied in step S223, the process proceeds to step S224.

In step S224, the determination unit 387 compares a preset threshold value T3 to the difference minimum value generated by the minimum value calculation unit 386.

When the relation of difference minimum value >T3 is satisfied, the process proceeds to step S228 and this region is determined as the "motion estimation (ME) failure region (Flat=0)."

On the other hand, when the relation of difference minimum value >T3 is not satisfied in step S224, the process proceeds to step S225.

In step S225, the determination unit 387 compares a preset threshold value T4 to the difference maximum value generated by the maximum value calculation unit 385.

When the relation of difference maximum value <T4 is satisfied, the process proceeds to step S227 and this region is determined as the "motion estimation (ME) success region (Flat=3)."

On the other hand, when the relation of difference maximum value <T4 is not satisfied in step S225, the process proceeds to step S226 and this region is determined as the "boundary region (Flat=1 to 2)."

Thus, the first motion region detection unit 311 shown in FIG. 9 generates the motion region detection information [Flat-map] of each block unit using the pixel information regarding the corresponding block between the standard image and the motion-compensated image (MC image) of the reference image and the success determination information of the block unit regarding the motion estimation (ME) process for the motion-compensated image (MC image). The flat map is a map corresponding to the flat value (Flat=0 to 3) as the index value indicating whether the block is the motion region by the block unit. The above-described exemplary process has been described as a process performed by the block unit, but may be a process performed by a pixel unit.

The flat map is a motion region determination index value indicating the degree of the possibility that each block of the standard image is the motion region.

For example, one of the values of Flat=0 to 3 is a map set in each block.

As the flat value is smaller (closer to Flat=0), the flat value indicates that a region is the motion region. As the flat value is higher (closer to Flat=3), the flat value indicates that a region is not the motion region.

(2b-2) Configuration and Process of Second Motion Region Detection Unit (Hit Map Generation Unit)

Next, the detailed configuration and process of the second motion region detection unit (hit map generation unit) 312 will be described.

The second motion region detection unit (hit map generation unit) 312 performs a process of comparing the global motion vector (GMV) to the local motion vector (LMV) to generate the motion region detection information [Hit-map]. The process of generating the hit map is the same as the process disclosed in Japanese Patent Application No. 2008-144157 (Japanese Unexamined Patent Application Publication No. 2009-290827) applied earlier by the applicant.

Figure 14:
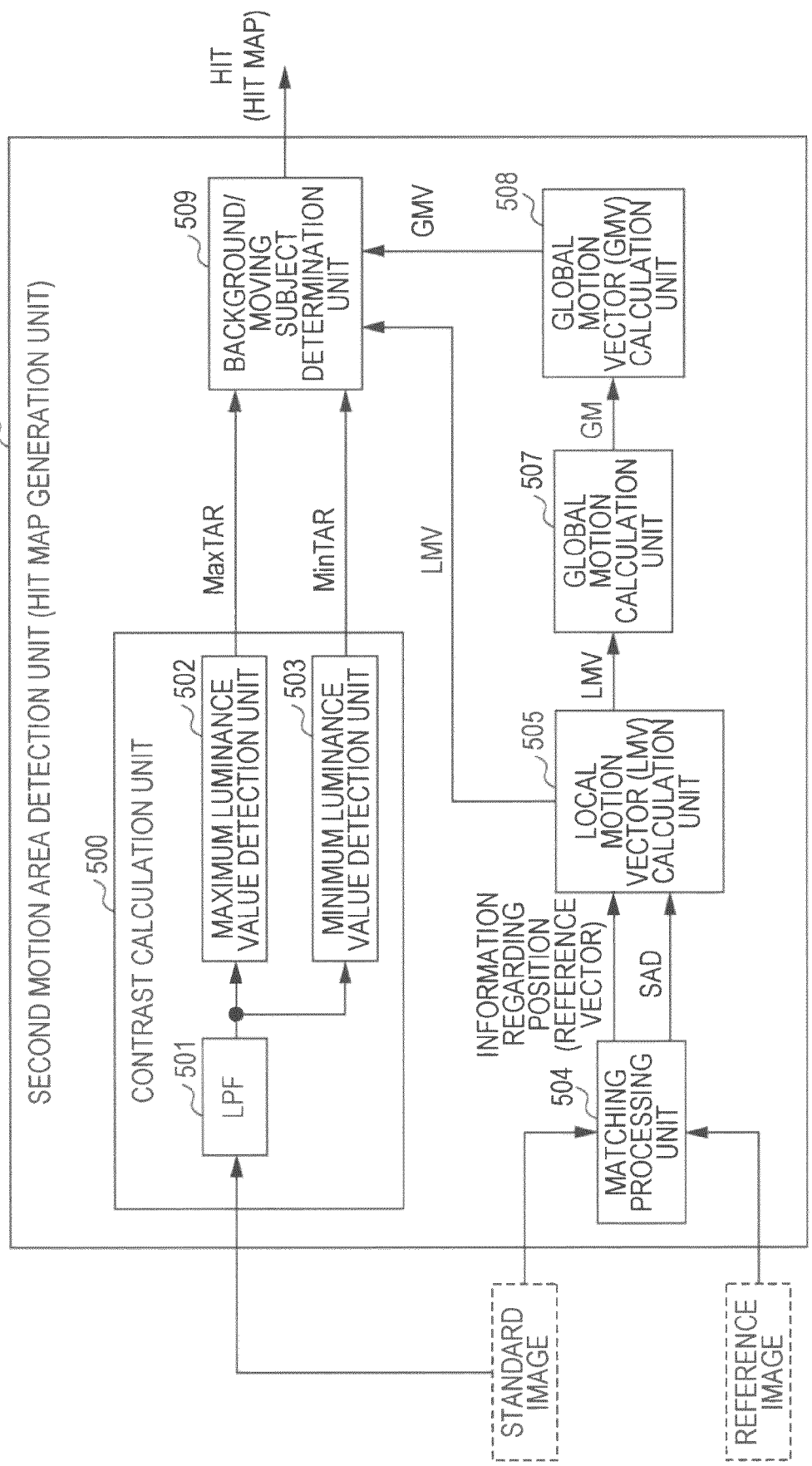
FIG. 14 is a diagram illustrating an exemplary configuration and an exemplary process of a second motion region detection unit set in the addition determination unit.

FIG. 14 is a diagram illustrating an exemplary configuration of the second motion region detection unit (hit map generation unit) 312. In this example, the second motion region detection unit (hit map generation unit) 312 includes a matching processing unit 504 calculating the SAD value for the corresponding pixels between a small region (block) of the standard image and a small region (block) of the reference image. As described above, the SAD value is a sum-of-absolute difference (SAD) of the pixel value of each block of the standard image and the reference image.

The second motion region detection unit (hit map generation unit) 312 includes a local motion vector calculation unit 505 calculating a local motion vector from information regarding the SAD value output from the matching processing unit 504. Moreover, the second motion region detection unit 312 includes a motion vector reliability index value calculation unit 506, a global motion calculation unit 507, a global motion vector calculation unit 508, a contrast calculation unit 500, and a background/moving subject determination unit 509.

The contrast calculation unit 500 includes a lowpass filter 501, a maximum luminance value detection unit 502, and a minimum luminance value detection unit 503.

The matching processing unit 504 inputs image data regarding the small region (block) of the standard image and the small region (block) of the reference image and supplies a reference vector (position information regarding the small region (block) of the reference image) and the SAD value of the result of a block matching process to the local motion vector calculation unit 505.

The local motion vector calculation unit 505 inputs the image data regarding the small region (block) of the standard image and the small region (block) of the reference image, performs the block matching process for the reference vector (the positional information regarding the small region (block) of the reference image), and performs position adjustment between the block of the reference image and the corresponding block of the standard image to calculate the local motion vectors (LMV) which is a motion vector of a block unit. The calculated local motion vector (LMV) is input to the background/moving subject determination unit 509 and the global motion calculation unit 507.

The global motion calculation unit 507 calculates global motion as a motion of the entire image of the standard image and the reference image based on the plurality of local motion vectors (LMV) input from the local motion vector calculation unit 505. This process can be performed, for example, by a process or the like of calculating the average value of the local motion vectors. Alternatively, the average value of the local motion vectors selected by a reliability determination algorithm of the predefined local motion vector may be calculated. The global motion calculation unit 507 supplies the calculated global motion (GM) to the global motion vector calculation unit 508.

The global motion vector calculation unit 508 calculates the global motion vector (GMV) of a small region (block) of the standard image by applying the global motion (GM) to the position (for example, central position) of the coordinates of the small region (block) of the standard image.

The global motion vector calculation unit 508 supplies the calculated global motion vector (GMV) to the background/moving subject determination unit 509. The local motion vector (LMV) from the local motion vector calculation unit 505 is also supplied to the background/moving subject determination unit 509.

The background/moving subject determination unit 509 compares the local motion vector (LMV) to the global motion vector (GMV) for each small region (block) of the standard image to determine the degree of agreement, that is, the degree of background agreement, between the local motion vector and the global motion vector for the small region (block) of the standard image. In this case, the background/moving subject determination unit 509 compares the correlation values (SAD values) to each other for the small regions (blocks) of the reference images corresponding to the local motion vector (LMV) and the global motion vector (GMV) to perform determination between the background and the moving subject.

The process and the detailed configuration of the background/moving subject determination unit 509 will be described with reference to FIGS. 15 to 17.

First, the overview of a process performed by the background/moving subject determination unit 509 will be described with reference to FIGS. 15 and 16.

Figure 15:
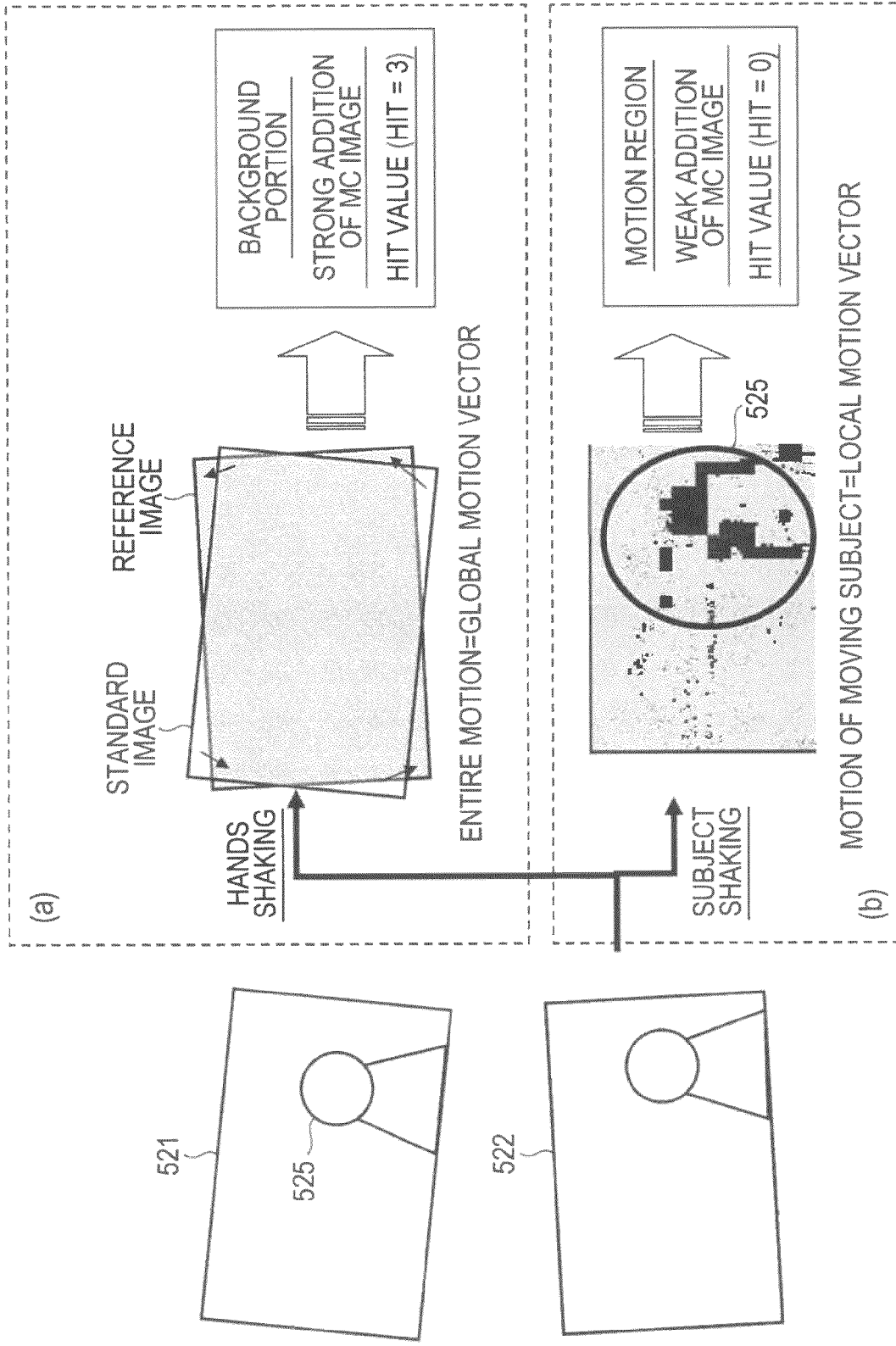
FIG. 15 is a diagram illustrating the overview of a process of a background/moving subject determination unit of the second motion region detection unit.

FIG. 15 is a diagram illustrating a standard image 521 and a reference image 522. The standard image 521 and the reference image 522 are continuously photographed images. In the two images 521 and 522 in which a moving subject such as a person is photographed, the images are photographed in a state where the entire images are moved due to, for example, shaking of user's hands. The motion of the entire image corresponds to the global motion vector (GMV).

In a small region (block) of the background other than a motion region 525 such as a person, the local motion vector (LMV) corresponding to the block is nearly equal to the global motion vector (GMV).

However, the local motion vector (LMV) of the block including the motion region 525 such as a person is different from the global motion vector (GMV).

Thus, the background/moving subject determination unit 509 compares the local motion vector (LMV) to the global motion vector (GMV) by the unit of the small region. When the difference is large, the background/moving subject determination unit 509 determines that the region is the motion region. On the other hand, when the difference is small, the background/moving subject determination unit 509 determines that the region is not the motion region.

The background/moving subject determination unit 509 generates and outputs the hit map in which a hit value (for example, Hit=0 to 3) serving as the determination value indicating the region is the motion region corresponds to each small region (block).

The hit value indicates that a region is a motion region when the hit value is smaller (closer to 0). The hit value indicates that a region is not a motion region when the hit value is larger (closer to 3).

In part (a) of FIG. 15, a setting example of the hit value for a block in which a difference between the local motion vector (LMV) and the global motion vector (GMV) is small is shown. The hit value (Hit=2 to 3) is set in a small region determined not to be a motion region. In this region, an addition ratio of the motion-compensated image (MC image) based on the reference image is made to be high in order to have high noise reduction effect.

On the other hand, in part (b) of FIG. 15, a setting example of the hit value for a block in which a difference between the local motion vector (LMV) and the global motion vector (GMV) is large is shown. The hit value (Hit=0 to 1) is set in a small region determined to be a motion region. This region has no noise reduction effect, although an addition ratio of the motion-compensated image (MC image) based on the reference image is made to be high.

A specific processing example of the background/moving subject determination unit 509 will be described with reference to FIG. 16.

Figure 16:
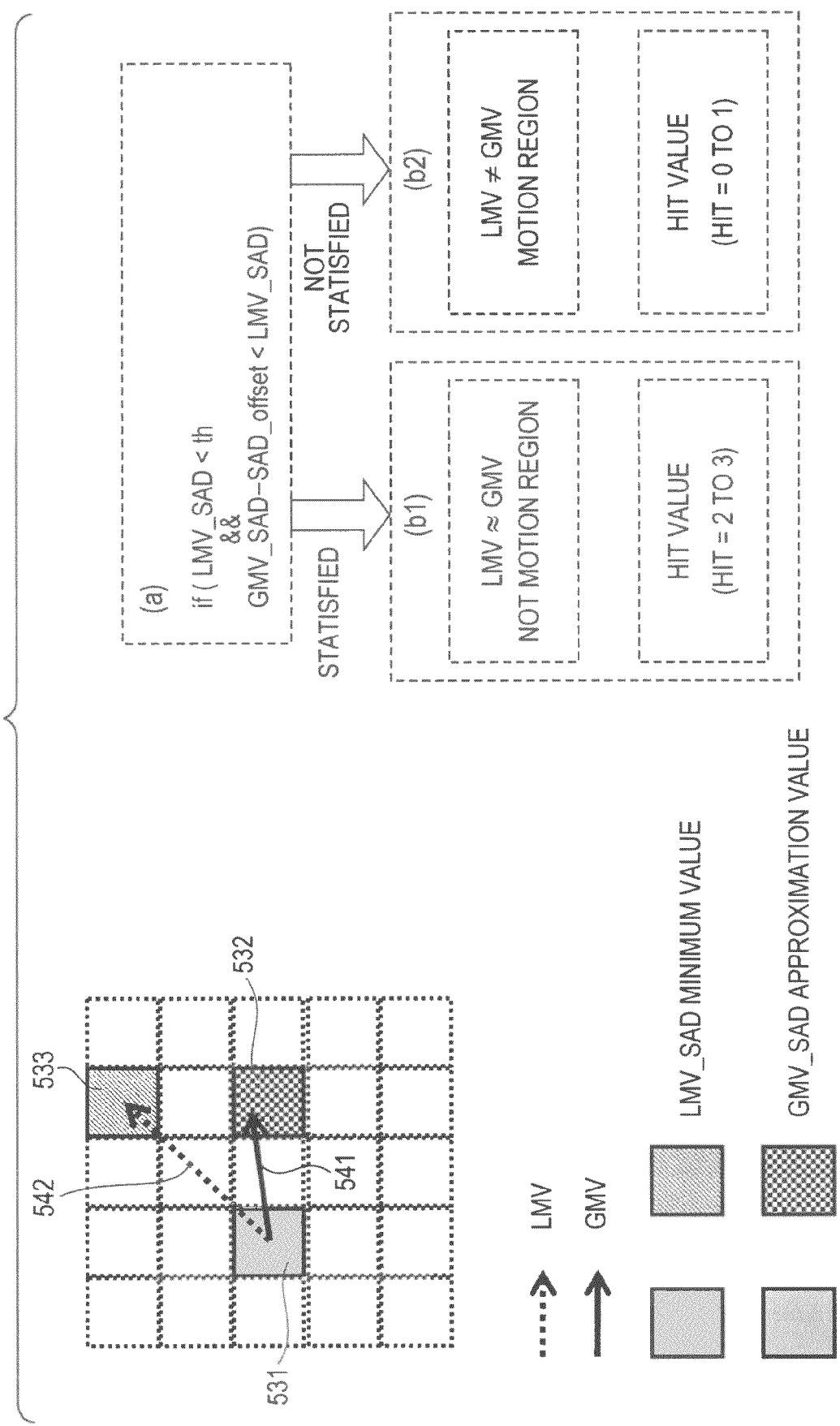
FIG. 16 is a diagram illustrating the process of a background/moving subject determination unit of the second motion region detection unit.
Figure 17:
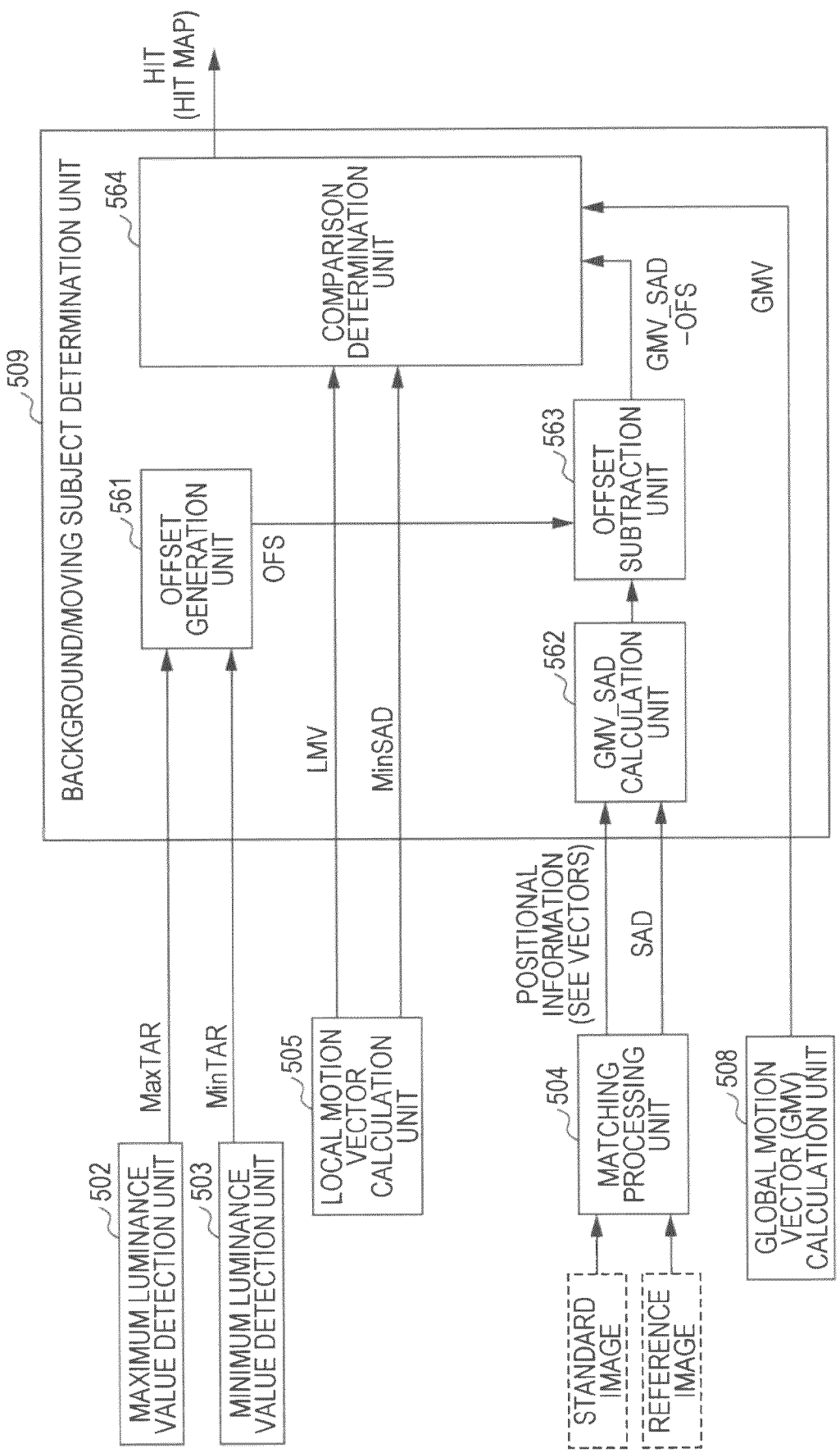
FIG. 17 is a diagram illustrating the detailed configuration and process of a background/moving subject determination unit of the second motion region detection unit.

In FIG. 16, a block 531 is shown in which the local motion vector (LMV) and the global motion vector (GMV) are detected.

The local motion vector (LMV) is calculated as a vector binding blocks with the minimum SAD value of the blocks selected from the reference image for the blocks of the standard image.

On the other hand, the global motion vector (GMV) is a vector indicating the motion information of the entire image calculated based on the plurality of local motion vectors (LMV) between the standard image and the reference image.

These vectors can be calculated by applying the sum-of-absolute difference (SAD) of the pixel values between the blocks.

For example, the LMV and the GMV corresponding to the block 531 shown in FIG. 16 are an LMV 542 and a GMV 541, respectively.

The background/moving subject determination unit 509 performs the process of determining whether the block 531 is the motion region using the following determination expression, for example, as shown in part (a) of FIG. 16:

if (LMV_SAD<th
&&
GMV_SAD−SAD_offset)<(LMV_SAD).

In the above expression, LMV_SAD is an SAD value between the blocks in which the local motion vector (LMV) is defined.

GMV_SAD is an SAD value between the blocks in which the global motion vector (GMV) is defined.

In addition, th is a preset threshold value.

SAD_offset is an offset value defined in advance.

When the relation of LMV_SAD<th is satisfied, it can be determined that the reliability of the local motion vector (LMV) is high.

Moreover, when the relation of GMV_SAD−SAD_offset) <(LMV_SAD is satisfied, it can be determined that the reliability of the GMV is high.

Therefore, when the if statement is satisfied, it can be determined that LMV≈GMV, as shown in part (b1) of FIG. 16 and thus it can be determined that the region is not the motion region.

In this case, the hit value (Hit=2 to 3) indicating that the region is not the motion region can be made to correspond to the block.

On the other hand, when the if statement is not satisfied, it can be determined that LMV≠GMV, as shown in part (b2) of FIG. 16 and thus it can be determined that the region is the motion region.

In this case, the hit value (Hit=0 to 1) indicating that the region is the motion region can be made to correspond to the block.

The exemplary detailed configuration of the background/moving subject determination unit 509 will be described with reference to FIG. 17. An offset generation unit 561 calculates an offset value (OFS=SAD_offset) described with reference to FIG. 16. The offset generation unit 561 generates the offset value OFS according to the noise of an image and supplies the offset value OFS to an offset subtraction unit 563. The noise of the image corresponds to the luminance value to the image. In this example, information regarding a correspondence table between various luminance values and the offset value OFS is stored in the offset generation unit 561.

The offset generation unit 561 calculates a block luminance value of the standard image as a difference between a maximum luminance value MaxTAR from the maximum luminance value detection unit 502 and a minimum luminance value MinTAR from the minimum luminance value detection unit 503. The offset generation unit 561 retrieves the correspondence table in which the calculated block luminance value of the standard image is stored in advance as a parameter and acquires the offset value OFS corresponding to the luminance value of the parameter.

The offset subtraction unit 563 subtracts the offset value OFS from the offset generation unit 561 from the SAD value GMV-SAD from a GMV_SAD detection unit 562 and generates a corrected SAD value, that is, GMV_SAD−OFS. Moreover, the offset value (OFS) corresponds to SAD_offset shown in part (a) of FIG. 16.

The offset subtraction unit 563 supplies the generated corrected SAD value to a comparison determination unit 564.

The comparison determination unit 564 calculates the hit value (Hit=0 to 3) corresponding to each block by the determination expression described above with reference to part (a) of FIG. 16.

That is, it is determined whether the following statement is satisfied:
if (LMV_SAD<th
&&
GMV_SAD−SAD_offset)<(LMV_SAD).

Therefore, when the if statement is satisfied, it can be determined that LMV≈GMV, as shown in part (b1) of FIG. 16 and thus it can be determined that the region is not the motion region.

In this case, the hit value (Hit=2 to 3) indicating that the region is not the motion region can be made to correspond to the block.

On the other hand, when the if statement is not satisfied, it can be determined that LMV≠GMV, as shown in part (b2) of FIG. 16 and thus it can be determined that the region is the motion region.

In this case, the hit value (Hit=0 to 1) indicating that the region is the motion region can be made to correspond to the block.

The comparison determination unit 564 may not set two pattern divisions of whether the expression shown in part (a) of FIG. 16 is satisfied, but may set two or more arbitrary divisions, for example, the hit values (Hit=0 to 3) as divisions showing a possibility of the motion regions to respective blocks according to the values of the differences between (GMV_SAD−SAD_offset) and (LMV_SAD). The output data are the hit map.

The hit map is an index value of the motion region determination indicating the degree of the possibility that each block of the standard image is the motion region and is a map in which one of the values of Hit=0 to 3 is set as each block.

For example, as the hit value is lower (closer to Hit=0), the hit value indicates that the region is the motion region. As the hit value is higher (closer to Hit=3), the hit value indicates that the region is not the motion region.

In this embodiment, as described with reference to FIG. 14, the standard image and the reference image are input to the second motion region detection unit (hit map generation unit) 312, and then the second motion detection unit (hit map generation unit) 312 calculates the local motion vector (LMV) and the global motion vector (GMV). The vectors (LMV/GMV) can be calculated by the motion prediction processing unit 302 of the image processing apparatus 300 shown in, for example, FIG. 8. Therefore, the vectors (LMV/GMV) calculated by the motion prediction processing unit 302 may be input and used in the second motion region detection unit (hit map generation unit) 312. With such a configuration, the local motion vector calculation unit 505 or the global motion vector calculation unit 508 shown in FIG. 14 may be omitted.

(2b-3) Configuration and Process of Control Map Generation Unit

Next, the process performed by the control map generation unit 313 of the addition determination unit 304 shown in FIG. 9 will be described with reference to FIGS. 18 and 19.

The control map generation unit 313 inputs the flat map (Flat=0 to 3) from the first motion region detection unit (flat map generation unit) 311 and inputs the hit map (Hit=0 to 3) from the second motion region detection unit (hit map generation unit) 312.

Both the flat map and the hit map are determination information indicating whether the block of the standard image is a motion region.

The control map generation unit 313 acquires data in which the flat value and the hit value individually correspond to each block of the standard image.

The control map generation unit 313 generates and outputs the control map, in which the final motion determination information corresponding to each block of the standard image is set, using the two pieces of data.

Figure 18:
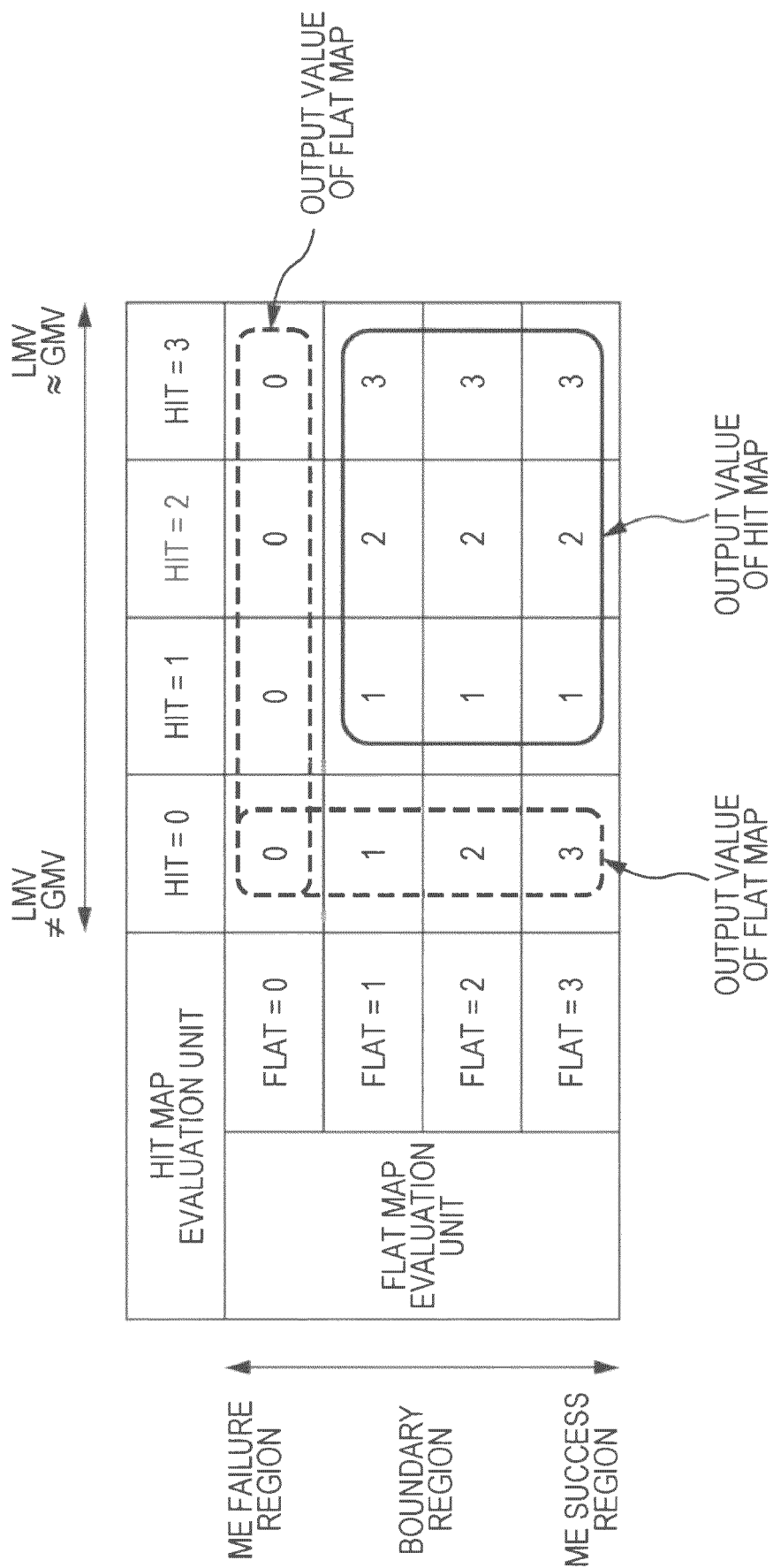
FIG. 18 is a diagram illustrating a process of a control map generation unit of the addition determination unit.
Figure 19:
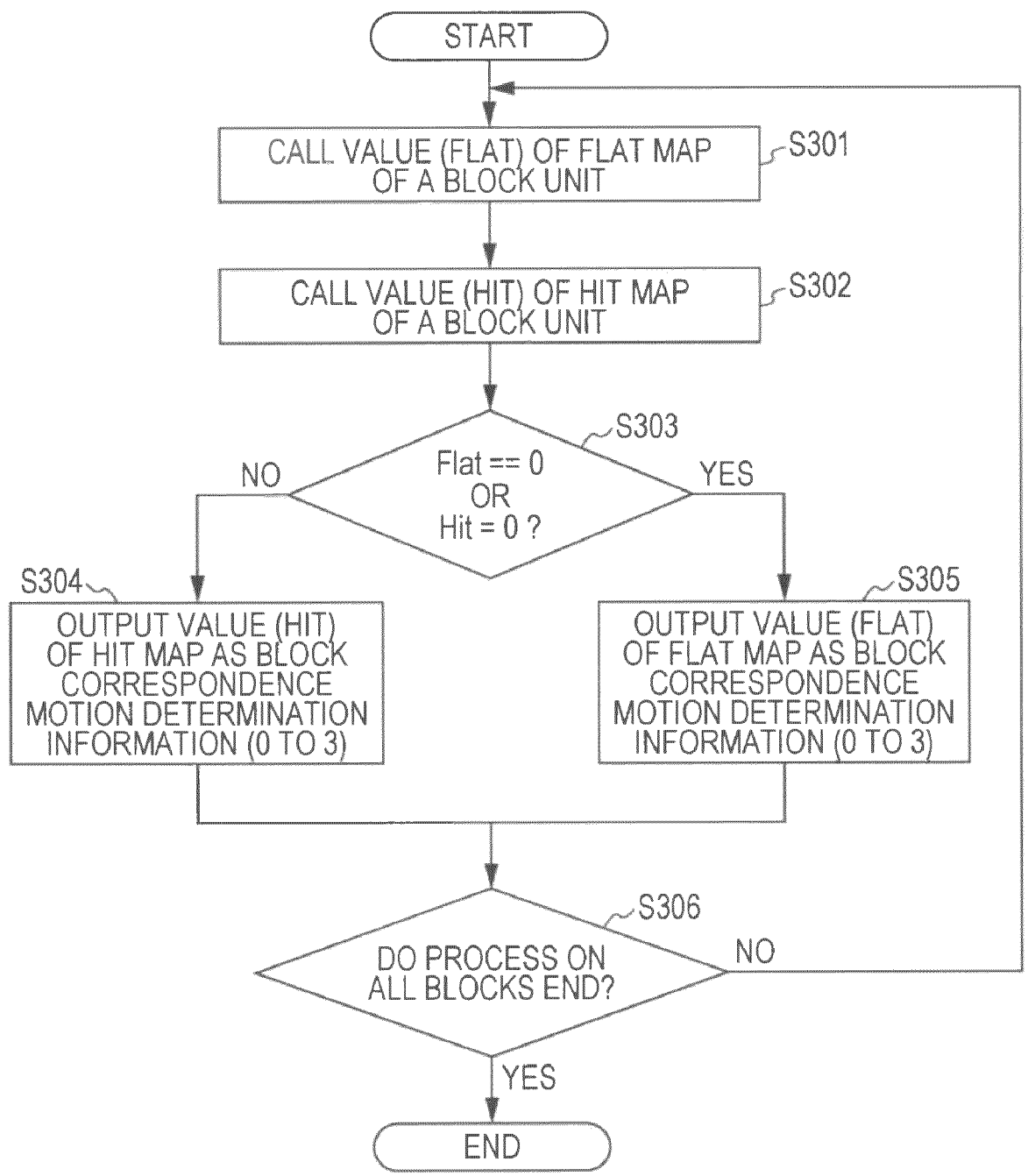
FIG. 19 is a flowchart illustrating the process of the control map generation unit of the addition determination unit.

FIG. 18 is a diagram illustrating a generation example of the control map generated by the control map generation unit 313, that is, the final motion determination information corresponding to each block of the standard image.

In a table shown in FIG. 18, the flat values (Flat=0 to 3) input from the first motion region detection unit (flat map generation unit) 311 are set in a vertical direction and the hit values (Hit=0 to 3) input from the second motion region detection unit (hit map generation unit) 312 are set in a horizontal direction.

The control map generation unit 313 determines and outputs values (0 to 3) at intersection positions as the motion determination information corresponding to the final block.

Specifically, when one of the hit value (Hit) and the flat value (Flat) is 0, that is, Hit=0 or Flat=0, the flat values (Flat=0 to 3) are output as the final motion determination information of the block. The flat values are a range area indicated by a dotted line shown in FIG. 18.

On the other hand, when neither the hit values (Hit) nor the flat values (Flat) are 0, that is, Hit≠0 and Flat≠0, the hit values (Hits=0 to 3) are output as the final motion determination information of the block. The flat values are a range area indicated by a solid line shown in FIG. 18.

Like the flat value or the hit value, when the value of the final motion determination information (0 to 3) is smaller (closer to 0), the region is highly likely to be a motion region.

On the other hand, when the value of the final motion determination information is larger (closer to 3), the region is not likely to be a motion region.

The final motion determination information is such setting information.

The control map generation unit 313 outputs the determined value of the first motion region detection unit 311 as the final determined value in the region determined to be highly likely to be the motion region by at least one of the two motion region determination value output by the first motion region detection unit 311 and the second motion region detection unit 312. The control map generation unit 313 outputs the determined value of the second motion region detection unit 312 as the final determined value in the region determined to be unlikely to be the motion region by both of the two motion region determination value output by the first motion region detection unit 311 and the second motion region detection unit 312.

The processing sequence of the control map generation unit 313 will be described with reference to the flowchart shown in FIG. 19.

In step S301, the control map generation unit 313 first acquires the values (Flat=0 to 3) of the flat map of the block selected from the standard image which is a noise reduction processing target.

Next, in step S302, the control map generation unit 313 acquires the values (Hit=0 to 3) of the hit map of the same block.

Next, in step S303, the control map generation unit 313 verifies the flat values (Flat=0 to 3) and the hit values (hit=0 to 3) acquired for the selected block in step S301 and determines whether one of the hit value and the flat value is 0. That is, the control map generation unit 313 determines whether Hit=0 or Flat=0.

When the determination result is Yes, the process proceeds to step S305, and the flat value (Flat=0 to 3) set as the final motion determination information for the block is selected and output. This process corresponds to a process for the region of the range indicated by the dotted line shown in FIG. 18.

On the other hand, when the determination result of step S303 is No, that is, neither of the hit value (Hit) nor the flat value (Flat) are 0, that is, when Hit≠0 and Flat≠0, the process proceeds to step S304, and the hit value (Hit=0 to 3) set as the final motion determination information for the block is output. This process corresponds to a process for the region of the range indicated by the solid line shown in FIG. 18.

Finally, the process proceeds to step S306 to determine whether the setting of the motion region information for all of the blocks of the standard image is completed. When there is a block not processed, the process returns to step S301 to perform the process for the block not processed.

When it is determined that the setting of the motion region information for all of the blocks of the standard image is completed in step S306, the process ends.

Thus, the control map generation unit 313 selects one of the set values of the hit map or the flat map for all of the blocks of the standard image and generates the control map set as the motion region information. The generated control map is output to the noise determination table generation unit 314 shown in FIG. 9.

(2b-4) Configuration and Process of Noise Determination Table Generation Unit

Next, the configuration and the process of the noise determination table generation unit 314 of the addition determination unit 304 shown in FIG. 9 will be described.

As described above, the control map generation unit 313 generates the control map in which the motion determination information is set for each block of the standard image. For example, the control map is a map in which one value of the motion determination information=0 to 3 is set by the block unit of the standard image.

Like the flat value or the hit value, when the value of the motion determination information (0 to 3) is smaller (closer to 0), the region is highly likely to be a motion region.

On the other hand, when the value of the motion determination information is larger (closer to 3), the region is not likely to be a motion region. The motion determination information is such setting information.

The noise determination table generation unit 314 inputs the control map in which the motion determination information (0 to 3) is set by the block unit of the standard image and performs the correction process on the noise determination table used in the addition determination processing execution unit 315 of the addition determination unit 304 shown in FIG. 9.

The noise determination table is a table applied when the addition weight of the corresponding pixels of the motion-compensated image (MC image) calculated in the addition process of the corresponding pixels between the reference image and the motion-compensated image (MC image).

The noise determination table generation unit 314 inputs the motion determination result of each small region (block) unit from the control map generation unit 313 and generates the noise determination table corresponding to the small region (block) according to the determination result.

The noise determination table is relation data between the pixel value and the noise amount. The noise determination table is a table set in the addition determination process execution unit 315 and applied in the noise estimation unit. For example, the addition determination process execution unit 315 has the same configuration as the configuration of the addition determination unit described above with reference to FIG. 4.

As described above with reference to FIG. 4, the addition determination unit 14 shown in FIG. 4 includes the noise estimation units 110, 130, and 150. The noise estimation units 110, 130, and 150 have the relation data between the luminance value measured in advance under each condition and the noise amount as a table. In the example described with reference to FIG. 4, the noise amount corresponding to the luminance value input by obtaining the relationship between the luminance value and the noise amount under the corresponding condition in the table maintained by the noise estimation unit 110 is output to the pixel addition determination unit 116, the moving average addition determination unit 117, and the moving dispersion addition determination unit 118.

For example, when the exposure time is longer, the random noise tends to increase. Moreover, as a gain for amplifying an imaging signal increases, the random noise tends to increase. Therefore, a table of the pixel value and the noise amount which correspond to each shutter speed and/or gain is generated and prepared using information regarding the shutter speed and/or the gain as the photographing condition. Moreover, a photographing mode of an imaging apparatus may be used as the photographing condition. The photographing condition is set for, for example, each frame.

The noise estimation unit 110 inputs the photographing mode, the shutter speed (exposure time), the gain, or the like having an influence on the noise amount in an image as the photographing condition information from a control unit of a camera, acquires the relationship between the luminance value and the noise amount under the corresponding condition from the data of the relationship between the noise amount and the luminance value measured in advance under each photographing condition, and outputs the noise amount corresponding to the luminance value input under the corresponding photographing condition.

A table indicating the noise amount corresponding to the input luminance value is the noise determination table. In this embodiment, the noise determination table is generated as a table corrected according to the value of the motion determination information=0 to 3 for each block of the standard image input from the control map generation unit 313.

In the embodiment described below, an example in which three kinds of correction tables are generated according to the motion determination information=0 to 3 will be described.

The correction process performed according to three kinds of motion determination information=0 to 1, motion determination information=1 to 2, and motion determination information=2 to 3 will be described.

In the correction of the table, the invention is not limited to the three kinds of correction tables, but four kinds of tables may be generated according to four kinds (0, 1, 2, and 3) of the motion determination information=0 to 3. Moreover, five or more kinds of tables may be generated as smaller divided tables.

Thus, the noise determination table generation unit 314 generates the different noise determination tables according to the values of the motion determination information=0 to 3 for the respective blocks of the standard image input from the control map generation unit 313 and supplies the different noise determination tables to the noise estimation unit of the addition determination process execution unit 315 (for example, having the same configuration shown in FIG. 4) shown in FIG. 9.

The noise estimation unit of the addition determination process execution unit 315 selects the table corresponding to the region including the pixels input as the processing targets in the addition determination processing execution unit 315, that is, the pixels input as the addition weight calculation targets and acquires the relationship between the pixel value (or the luminance value) and the noise amount from the selected table. Thereafter, the information regarding the relationship between the pixel value (or the luminance value) and the noise amount is output to the pixel addition determination unit, the moving average addition determination unit, and the moving dispersion addition determination unit (see FIG. 4) of the addition determination processing execution unit 315.

Each processing unit performs a process according to the information regarding the noise amount supplied from the noise estimation unit. That is, the pixel addition determination unit, the moving average addition determination unit, and the moving dispersion addition determination unit (see FIG. 4) performs processes in which the different estimated noise amounts are applied according to the motion determination information=0 to 3.

A specific example of the noise determination table will be described with reference to FIGS. 20A and 20B. FIG. 20A is a diagram illustrating three kinds of noise determination tables generated by the noise determination table generation unit 314. That is, three kinds of noise determination table are as follows:

(1) an original noise determination table (applied to the blocks of the motion determination information=1 to 2);

(2) a correction noise determination table (applied to the blocks of the motion determination information=2 to 3) in which an estimated noise amount is corrected so as to increase; and (3) a correction noise determination table (applied to the blocks of the motion determination information=0 to 1) in which an estimated noise amount is corrected so as to decrease.

The noise determination table is a table in which the estimated noise amount is determined according to the pixel value (or the luminance value). In the table, the estimated noise amount is determined according to the pixel value (or the luminance value) based on a solid line curve of the noise determination table in (1) the original noise determination table (applied to the block of the motion determination information=1 to 2) of FIG. 20. As the pixel value is lower, many noise components are included in the pixel value. As the pixel value is higher, fewer noise components are included in the pixel value.

Figure 20:
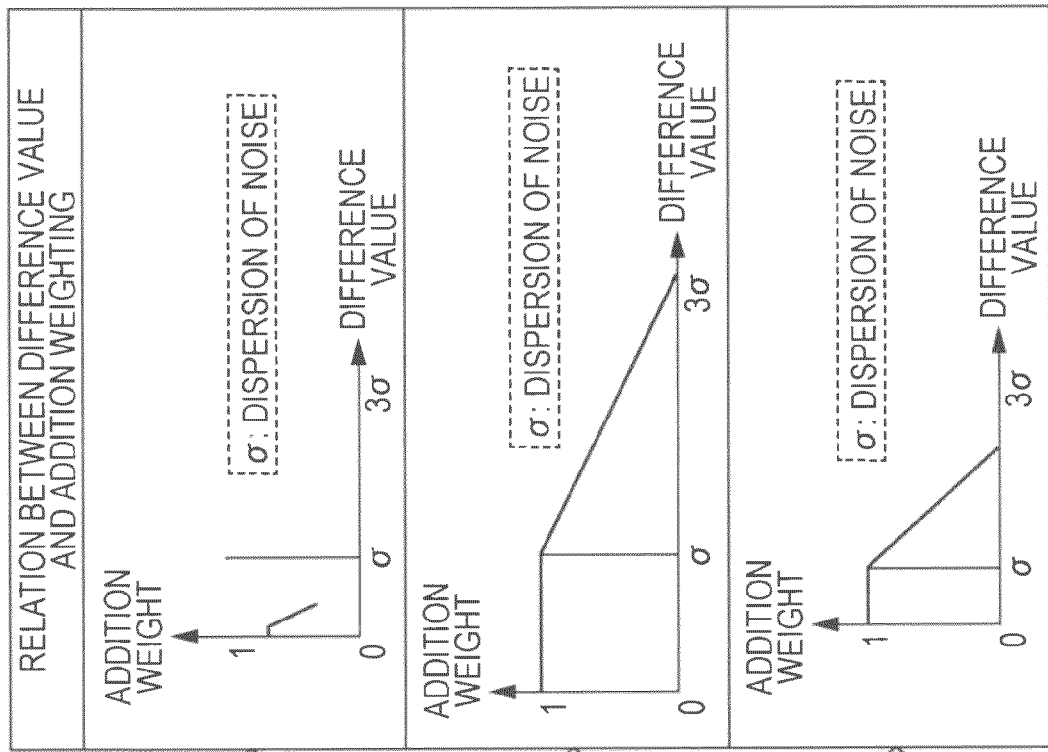
FIGS. 20A and 20B are diagrams illustrating a specific example of a noise determination table.

"(1) The original noise determination table" shown in the uppermost part of FIG. 20 is a table applied when calculating the addition weight of the pixels included in the block region where the "motion determination information=1 to 2" is set in the control map generation unit 313.

"(2) The correction noise determination table in which the estimated noise amount is corrected so as to increase" is a table applied when calculating the addition weight of the pixels included in the region with the "motion determination information=2 to 3 (region which is highly not likely to be motion region)" is determined in the control map generation unit 313.

"(3) The correction noise determination table in which the estimated noise amount is corrected so as to decrease" is a table applied when calculating the addition weight of the pixels included in the region with the "motion determination information=0 to 1 (region which is highly likely to be motion region)" is determined in the control map generation unit 313.

As understood from FIGS. 20A and 20B, the estimated noise amount is set to be larger in "(2) The correction noise determination table subjected to increasing correction of the estimated noise amount" in which the estimated noise amount is corrected so as to increase than in "(1) The original noise determination table". The estimated noise amount is set to be smaller in "(3) The correction noise determination table in which the estimated noise amount is corrected so as to decrease" than in "(1) The original noise determination table".

"(2) The correction noise determination table in which the estimated noise amount is corrected so as to increase" is a table applied when calculating the addition weight of the pixels included in the region with the "motion determination information=2 to 3 (region which is highly not likely to be motion region)" is determined in the control map generation unit 313.

That is, when the pixels of the standard image and the corresponding pixels of the motion-compensated image (MC image) are highly likely to be present in the same region of the same subject, "(2) the correction noise determination table in which the estimated noise amount is corrected so as to increase" is applied.

This process is a process that is based on the determination that it is determined that the noise detected from the pixels of this region is pure noise and is not noise generated due to the deviation of the pixel position and thus the large noise reduction process can be performed.

On the other hand, "(3) the correction noise determination table in which the estimated noise amount is corrected so as to decrease" is applied when calculating the addition weight of the pixels included in the region with the "motion determination information=0 to 1 (region which is highly likely to be motion region)" is determined in the control map generation unit 313.

That is, when the pixels of the standard image and the corresponding pixels of the motion-compensated image (MC image) are unlikely to be present in the same region of the same subject, "(3) the correction noise determination table in which the estimated noise amount is corrected so as to decrease" is applied.

This process is a process that is based on the determination that it is determined that the noise detected from the pixels of this region is not pure noise and is highly likely to be noise generated due to the deviation of the pixel position and thus it is better to avoid performing the large noise reduction process.

Thus, the noise determination table generation unit 314 modifies the noise determination table according to the motion determination information=0 to 3 generated by the control map generation unit 313 and performs the noise estimation. That is, the noise determination table generation unit 314 generates or corrects the noise determination table to increase the estimated noise amount corresponding to the pixel value in the region where the motion region determination information of the region unit output from the control map generation unit 313 sets the determination value representing that the region is unlikely to be the motion region. Moreover, the noise determination table generation unit 314 generates or corrects the noise determination table to reduce the estimated noise amount corresponding to the pixel value in the region where the motion region determination information of the region unit output from the control map generation unit 313 sets the determination value representing that the region is highly likely to be the motion region.

The generated or corrected noise determination table is used in the addition determination processing execution unit 315. The pixel addition determination unit, the moving average addition determination unit, and the moving dispersion addition determination unit (see FIG. 4) of the addition determination process execution unit 315 set the addition weight corresponding to each pixel, that is, the addition weight of the corresponding pixels of the motion-compensated image (MC image) corresponding to the pixels of the standard image according to the noise information estimated based on the noise determination table according to the motion determination information=0 to 3.

The addition determination process execution unit 315 performs a process of determining the addition weight to set a large addition weight in the region where there is a large noise amount of the pixel unit estimated by the noise determination table generated by the noise determination table generation unit 314 and to set a small addition weight in the region where there is a small noise amount of the pixel unit. FIG. 20B is a diagram illustrating a corresponding relationship between the difference value and the addition weight of the corresponding pixels between the standard image and the motion-compensated image (MC image). In addition, σ indicates the dispersion of the noise.

The pixel addition determination unit, the moving average addition determination unit, and the moving dispersion addition determination unit (see FIG. 4) of the addition determination process execution unit 315 set and calculate the different addition weight depending on the respective regions in order to apply the different estimated noise amounts according to the motion determination information=0 to 3. Specifically, a large pixel value of the motion-compensated image (MC image) is added in the block in which the motion determination information=2 to 3 (region highly likely not to be the motion region) is set, thereby improving the advantage of removing the noise. On the other hand, a large pixel value of the standard image is added in the block region in which the motion determination information=0 to 1 (region highly likely to be the motion region) is set, thereby improving the advantage of protecting the moving object.

(2b-5) Configuration and Process of Addition Determination Process Execution Unit Next, the process of the addition determination process execution unit 315 of the addition determination unit 304 shown in FIG. 9 will be described.

The addition determination process execution unit 315 of the addition determination unit 304 shown in FIG. 9 has the same configuration as the configuration described above with reference to FIG. 4. The addition determination process execution unit 315 generates and outputs the addition weight used in the addition processing unit 305 of the image processing apparatus 300 shown in FIG. 8 by the pixel unit to the addition processing unit 305. The addition weight is an addition weight of the motion-compensated image (MC image) for the standard image, as described above, and indicates the reliability of each pixel of the motion-compensated image (MC image).

However, the addition determination process execution unit 315 selects and uses the noise determination table generated and corrected by the above-described noise determination table generation unit 314 according to the value of the motion determination information=0 to 3 of the block. Specifically, the addition weight (the addition weight of the MC image for the standard image) of the pixel unit is calculated using the noise determination table corrected according to the values of the motion determination information=0 to 3 set based on the flat value and the hit value by the control map generation unit 313 for each block of the standard image. That is, the addition weight used in the addition processing unit 305 of the image processing apparatus 300 shown in FIG. 8 is generated by the pixel unit and is output to the addition processing unit 305.

The addition determination process execution unit 315 calculates the addition weight (the addition weight of the MC image for the standard image) of the pixel unit using the different noise determination tables according to the values of the motion determination information=0 to 3 of the block generated by the noise determination table generation unit 314. That is, the addition determination process execution unit 315 generates the addition weight used in the addition processing unit 305 of the image processing apparatus 300 shown in FIG. 8 by the pixel unit and outputs the addition weight to the addition processing unit 305 shown in FIG. 8.

(2c) Process of Addition Processing Unit

The addition processing unit 305 shown in FIG. 8 performs a process of applying and adding the addition weight calculated for each corresponding pixel between the standard image and the motion-compensated image (MC image). The process performed by the addition processing unit 305 is the same process as the process described above with reference to FIGS. 1 and 7.

The addition processing unit 305 performs the addition process by calculating the weighted average between the standard image and the motion-compensated image (MC image). The weight of the weighted average is a value obtained by multiplying an addition weight by a return ratio. For example, when the return ratio is set to 1/3 and when the addition weight is varied from 0 to 1, the weight for the MC image in the weighted average is varied from 0 to 1/3.

The addition result generated between the standard image and the motion-compensated image (MC image) by the addition processing unit 305 is stored in the frame memory 301. The image as a new standard image is combined with a new reference image and the above-described processes are repeatedly performed. For example, after the processes are repeated a predetermined number of times, the addition result generated between the standard image and the motion-compensated image (MC image) by the addition processing unit 305 is output as the noise-reduced image (NR image).

(3) Noise Reduction Effect of Image Processing Apparatus according to Embodiment of the Invention As described above, the image processing apparatus 300 shown in FIG. 8 performs, as the process of detecting the motion region based on the integration of the detection information of the motion region, the process of determining the motion region based on the two different approaches:

(a) motion region detection information [Flat-map] using success determination information of the motion estimation (ME) calculated based on the pixel difference information between the standard image and the motion-compensated image; and (b) motion region detection information [Hit-map] obtained through a process of comparing the global motion vector (GMV) and the local motion vector (LMV).

The control map generation unit 313 of the addition determination unit 304 shown in FIG. 9 generates the control map set as the motion region information by selecting one of the set values of the hit map and the flat map for all of the blocks of the standard image.

Specifically, when one of the hit value (Hit) and the flat value (Flat) is 0, that is, Hit=0 or Flat=0, the flat values (Flat=0 to 3) are output as the final motion determination information of the block. The flat values are a range area indicated by a dotted line shown in FIG. 18.

On the other hand, when neither the hit values (Hit) nor the flat values (Flat) are 0, that is, Hit≠0 and Flat≠0, the hit values (Hits=0 to 3) are output as the final motion determination information of the block. The flat values are a range area indicated by a solid line shown in FIG. 18.

When only the hit map is used as the motion determination information of the block unit, for example, the noise reduction effect for a local moving object may deteriorate.

When the photographing condition such as illumination change is changed, a problem may arise in that the noise reduction effect deteriorates.

This problem arises since the hit map is the motion region detection information by the process of comparing the global motion vector (GMV) to the local motion vector (LMV) and it is determined whether the block is the motion region depending on the difference between the LMV and the GMV of the block unit.

On the other hand, when only the flat map is used, a problem may arise in that the noise reduction effect deteriorates for an image photographed under an environment, such as low illumination, in which noise is strong.

This problem arises since the flat map is the motion region detection information obtained by using the success determination information of the motion estimation (ME) and presence or absence of the motion is determined based on the dispersion value or the average value of the pixel region, as described with reference to FIG. 10.

In the motion determination process according to the embodiment of the invention, however, the motion determination information set as in FIG. 18 is generated by integrating the hit map and the flat map.

In the setting shown in FIG. 18, for example, based on the hit map information, it can be estimated that the region of Hit=0 is the inner region of a moving subject, the region of Hit=1 to 2 is the boundary of the moving subject, and the region of Hit=3 is a region, such as the background region, other than the moving subject.

However, the values (Hit=0 to 3) of the hit map are obtained by the motion determination process based on the comparison between the LMV and the GMV and the determination result dependent on the precision of the LMV and the GMV. That is, when the precision of the vector is not sufficient, the determination result may include an error.

In the configuration according to the embodiment of the invention, the flat value (Flat=0 to 3) is taken into consideration in order to prevent setting error of the addition weight due to the erroneous calculation of the vector.

For example, when the flat value and the hit value meet each other in the region of Hit=0 determined to be the region of a moving subject by the comparison between the LMV and the GMV but the flat values (Flat=0 to 3) are set, the flat values (Flat=0 to 3) are set as the final motion determination information of the block and the noise determination table (see FIG. 20) is generated.

That is, in the region (Hit=0) determined as the region of the moving subject by the comparison between the LMV and the GMV, the value of Hit=0 is ignored and the flat values (Flat=0 to 3) which are the motion region detection information using the motion estimation (ME) success determination information are used as reliable motion determination information.

Accordingly, when a process is performed only based on the hit map, the addition weight for the standard image of the image pixels of the motion-compensated image (MC image) may be set to be small in the block where Hit=0 and thus the noise reduction effect may not be exerted depending on the case. However, in the process according to the embodiment of the invention, setting of the addition weight based on the flat values is performed even in the block where Hit=0 with reference to the flat values (Flat=0 to 3) of the flat map. Accordingly, according to the success determination information of the motion estimation (ME), the addition weight for the standard image of the pixel values of the motion-compensated image (MC image) is set to be large in the block (where the flat value is large (closer to Flat=3)) determined that the motion is small. Therefore, the noise reduction effect can be made to be large in the block corresponding to the motion estimation (ME) success region.

Even in the block where the flat value is 0 (Flat=0), that is, the block determined that the motion is large according to the success determination information of the motion estimation (ME), the hit values (Hit=0 to 3) are ignored and the flat value, that is, Flat=0 is set as the final motion determination information of the block.

This process prevents use of the erroneous motion determination result based on the error of the vector estimation which easily occurs in the comparison process between the LMV and the GMV. In the process, the addition weight of the motion-compensated image (MC image) is set based on the flat value (Flat=0).

In the configuration according to the embodiment of the invention, the determination result of the hit map (Hit=0 to 3) as the motion determination information generated by the comparison process between the LMV and the GMV is not used and the determination result of the flat map (Flat=0 to 3) as the motion determination information generated based on the success determination information of the motion estimation (ME) is preferentially used in the region where the determination result (Hit=0 or Flat=0) in which the region is highly likely to be the motion region based on one of the hit map and the flat map can be obtained.

The process enables the addition weight to be prevented from being set due to the error of the vector estimation.

In summary of the process according to the embodiment of the invention, two kinds of motion determination information, that is, the hit map (Hit=0 to 3) as the motion determination information generated by the comparison process between the LMV and the GMV and the flat map (Flat=0 to 3) as the motion determination information generated based on the success determination information of the motion estimation (ME) are generated. Then, the flat values (Flat=0 to 3), that is, the motion determination information generated based on the success determination information of the motion estimation (ME), are preferentially used in the region (block) determined to be highly likely the motion region due to the flat value=0 or the hit value=0 in the flat map or the hit map.

Moreover, the hit values (Hit=0 to 3), that is, the motion determination information generated based on the comparison result between the LMV and the GMV, are preferentially used in the region (block) determined not to be likely the motion region due to the flat value≠0 and the hit value≠0 in both maps of the flat map and the hit map.

Such a process is performed.

By selecting and applying the motion determination information (hit map/flat map) based on the different approaches according to the detection information of each map, the noise reduction effect for the image photographed under various conditions can be improved compared to a case where each map is singly used.

(4) Exemplary Hardware Configuration of Image Processing Apparatus

Figure 21:
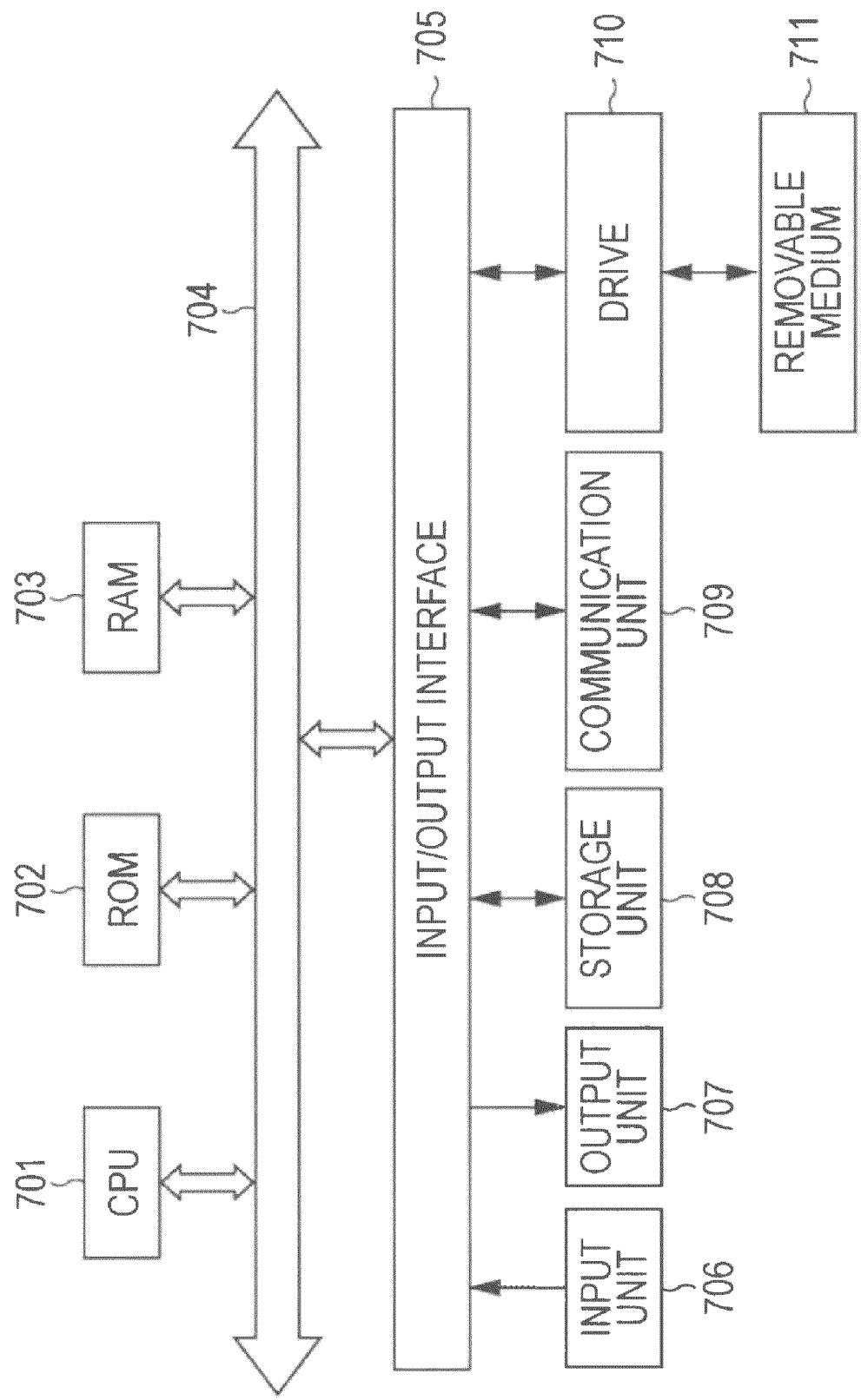
FIG. 21 is a diagram illustrating an exemplary hardware configuration of an image processing apparatus according to an embodiment of the invention.

Finally, an exemplary hardware configuration of a personal computer as an apparatus performing the above-described processes will be described with reference FIG. 21. A CPU (Central Processing Unit) 701 executes various kinds of processes according to a program stored in a ROM (Read Only Memory) 702 or a storage unit 708. For example, a processing program such as a process of generating a noise-reduced image (NR image) described in the above-described embodiments is executed. A RAM (Random Access Memory) 703 appropriately stores programs, data, or the like executed by the CPU 701. The CPU 701, the ROM 702, and the RAM 703 are connected to each other through a bus 704.

The CPU 701 is connected to an input/output interface 705 through the bus 704. An input unit 706 formed by a keyboard, a mouse, a microphone, or the like and an output unit 707 formed by a display, a speaker, or the like are connected to the input/output interface 705. The CPU 701 executes various kinds of processes according to instructions input from the input unit 706 and outputs the processing results to, for example, the output unit 707.

The storage unit 708 connected to the input/output interface 705 is configured by, for example, a hard disk and stores the programs executed by the CPU 701 and various kinds of data. A communication unit 709 communicates with an external apparatus via a network such as the Internet or a local area network.

A drive 710 connected to the input/output interface 705 drive a removable medium 711 such as a magnetic disc, an optical disc, a magneto-optical disc, or a semiconductor memory and acquires the recorded program, data, or the like. The acquired program or data is transmitted to the storage unit 708 and is stored, as necessary.

The specific embodiment of the invention has hitherto been described in detail. However, it is apparent to those who are skilled in the art that the modification and alternations of the embodiment may occur within the scope of the invention without departing from the gist of the invention. That is, since the invention is disclosed according to the embodiment, the invention should not be construed as limiting. The claims of the invention are referred to determine the scope of the invention.

The series of processes described in the specification may be executed by hardware, software, or the combined configuration thereof. When the processes are executed by software, a program recording the processing sequence may be installed and executed in a memory in a computer embedded in dedicated hardware or a program may be installed and executed in a general computer capable of various kinds of processes. For example, the program may be recorded in advance in a recording medium. As well as installing the program in a computer from the recording medium, the program may be received via a network such as a LAN (Local Area Network) or the Internet and may be installed in a recording medium such as a built-in hard disk.

The various kinds of processes described in the specification may be executed chronologically according to the description or may be executed in parallel or individually depending on the processing capacity of an apparatus executing the processes or as necessary. The system in the specification has a logical collective configuration of a plurality of apparatuses and is not limited to a case where the apparatuses with each configuration are included in the same chassis.

The present application contains subject matter related to that disclosed in Japanese Priority Patent Application JP 2010-065833 filed in the Japan Patent Office on Mar. 23, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a motion prediction processing unit detecting an inter-image motion between a standard image and a reference image;
a motion compensation processing unit generating a motion-compensated image by moving the reference image so as to be aligned with the standard image in a pixel position using information regarding the inter-image motion detected by the motion prediction processing unit;
an addition processing unit generating a noise-reduced image from which the noise of the standard image is reduced through an addition process of adding the standard image and the motion-compensated image; and
an addition determination unit calculating an addition weight of the motion-compensated image, which is applied to the addition process performed between the standard image and the motion-compensated image by the addition processing unit, by a pixel unit,
wherein the addition determination unit includes
a first motion region detection unit calculating a motion region determination value indicating a region including a moving subject by a region unit forming the standard image based on pixel difference information between the standard image and the motion-compensated image, a second motion region detection unit calculating a motion region determination value of the region unit by applying difference information between a local motion vector (LMV) which is motion information of the region unit and a global motion vector (GMV) which is motion information of an entire image, a control map generation unit selecting and outputting one of two motion region determination values output from the first motion region detection information and the second motion region detection information depending on a combination of the motion region determination values, a noise determination table generation unit generating or correcting a noise determination table in which an estimated noise amount corresponding to a pixel value is defined according to motion region determination information of a region unit output from the control map generation unit, and an addition determination processing execution unit determining the addition weight according to the noise amount of a pixel unit estimated based on the noise determination table generated by the noise determination table generation unit.

2. The image processing apparatus according to claim 1, wherein the control map generation unit outputs a determination value of the first motion region detection unit as a final determination value in a region determined to be highly likely to be a motion region by at least one of the two motion region determination values output from the first motion region detection unit and the second motion region detection unit, and wherein the control map generation unit outputs the determination value of the second motion region detection unit as a final determination value in a region determined not to be highly likely to be motion region according to both of the two motion region determination values output by the first motion region detection unit and the second motion region detection unit.

3. The image processing apparatus according to claim 1 or 2, wherein the noise determination table generation unit generates or corrects the noise determination table to increase the estimated noise amount corresponding to the pixel value in a region where a determination value indicating that the region is unlikely to be the motion region is set according to the motion region determination information of the region unit output from the control map generation unit, and wherein the noise determination table generation unit generates or corrects the noise determination table to reduce the estimated noise amount corresponding to the pixel value in a region where a determination value indicating that the region is highly likely to be the motion region is set according to the motion region determination information of the region unit output from the control map generation unit.

4. The image processing apparatus according to claim 1 or 2, wherein the addition determination process execution unit performs a process of determining the addition weight to set the addition weight to be large in a region where the noise amount of the pixel unit estimated by the noise determination table generated by the noise determination table generation unit is large and to set the addition weight to be small in a region where the noise amount of the pixel unit is small.

5. The image processing apparatus according to any one of claim 1 or 2, wherein the first motion region detection unit analyzes the standard image and the motion-compensated image to determine whether each region divided from the motion-compensated image is a region corresponding to one of (a) a motion estimation (ME) success region, (b) a motion estimation (ME) failure region, and (c) a boundary region which is neither of (a) the motion estimation (ME) success region nor (b) motion estimation (ME) failure region, and calculates a motion region determination value of each small region according to the determination result.

6. An image processing method of generating a noise-reduced image in an image processing apparatus, comprising the steps of:

detecting, by a motion prediction processing unit, an inter-image motion between a standard image and a reference image;

generating, by a motion compensation processing unit, a motion-compensated image by moving the reference image so as to be aligned with the standard image in a pixel position using information regarding the inter-image motion detected by the motion prediction processing unit;

generating, by an addition processing unit, a noise-reduced image from which noise of the standard image is reduced through an addition process of adding the standard image and the motion-compensated image; and calculating, by an addition determination unit, an addition weight of the motion-compensated image, which is applied to the addition process performed between the standard image and the motion-compensated image by the addition processing unit, by a pixel unit, wherein the step of calculating the addition weight includes the steps of firstly calculating a motion region determination value indicating a region including a moving subject by a region unit forming the standard image based on pixel difference information between the standard image and the motion-compensated image, secondly calculating a motion region determination value of the region unit by applying difference information between a local motion vector (LMV) which is motion information of the region unit and a global motion vector (GMV) which is motion information of an entire image, selecting and outputting one of two motion region determination values output from the first motion region detection information and the second motion region detection information depending on a combination of the motion region determination values, generating or correcting a noise determination table in which an estimated noise amount corresponding to a pixel value is defined according to motion region determination information of a region unit output in the step of selecting and outputting one of the two motion region determination values, and determining the addition weight according to the noise amount of a pixel unit estimated based on the noise determination table generated in the step of generating or correcting the noise determination table.

7. A non-transitory computer-readable medium including a program, which when executed by a processor of an image processing apparatus, causes the image processing apparatus to execute a process of generating a noise-reduced image, the process comprising:

detecting, by a motion prediction processing unit, an inter-image motion between a standard image and a reference image;

generating, by a motion compensation processing unit, a motion-compensated image by moving the reference image so as to be aligned with the standard image in a pixel position using information regarding the inter-image motion detected by the motion prediction processing unit;

generating, by an addition processing unit, a noise-reduced image from which noise of the standard image is reduced through an addition process of adding the standard image and the motion-compensated image; and calculating, by an addition determination unit, an addition weight of the motion-compensated image, which is applied to the addition process performed between the standard image and the motion-compensated image by the addition processing unit, by a pixel unit, wherein the step of calculating the addition weight includes the steps of firstly calculating a motion region determination value indicating a region including a moving subject by a region unit forming the standard image based on pixel difference information between the standard image and the motion-compensated image, secondly calculating a motion region determination value of the region unit by applying difference information between a local motion vector (LMV) which is motion information of the region unit and a global motion vector (GMV) which is motion information of an entire image, selecting and outputting one of two motion region determination values output from the first motion region detection information and the second motion region detection information depending on a combination of the motion region determination values, generating or correcting a noise determination table in which an estimated noise amount corresponding to a pixel value is defined according to motion region determination information of a region unit output in the step of selecting and outputting one of the two motion region determination values, and determining the addition weight according to the noise amount of a pixel unit estimated based on the noise determination table generated in the step of generating or correcting the noise determination table.

8. The image processing apparatus according to claim 3, wherein the addition determination process execution unit performs a process of determining the addition weight to set the addition weight to be large in a region where the noise amount of the pixel unit estimated by the noise determination table generated by the noise determination table generation unit is large and to set the addition weight to be small in a region where the noise amount of the pixel unit is small.

9. The image processing apparatus according to claim 8, wherein the first motion region detection unit analyzes the standard image and the motion-compensated image to determine whether each region divided from the motion-compensated image is a region corresponding to one of (a) a motion estimation (ME) success region, (b) a motion estimation (ME) failure region, and (c) a boundary region which is neither of (a) the motion estimation (ME) success region nor (b) motion estimation (ME) failure region, and calculates a motion region determination value of each small region according to the determination result.

10. The image processing apparatus according to claim 3, wherein the first motion region detection unit analyzes the standard image and the motion-compensated image to determine whether each region divided from the motion-compensated image is a region corresponding to one of (a) a motion estimation (ME) success region, (b) a motion estimation (ME) failure region, and (c) a boundary region which is neither of (a) the motion estimation (ME) success region nor (b) motion estimation (ME) failure region, and calculates a motion region determination value of each small region according to the determination result.

11. The image processing apparatus according to claim 4, wherein the first motion region detection unit analyzes the standard image and the motion-compensated image to determine whether each region divided from the motion-compensated image is a region corresponding to one of (a) a motion estimation (ME) success region, (b) a motion estimation (ME) failure region, and (c) a boundary region which is neither of (a) the motion estimation (ME) success region nor (b) motion estimation (ME) failure region, and calculates a motion region determination value of each small region according to the determination result.

* * * * *